(12) United States Patent
Kitamura et al.

(10) Patent No.: US 7,619,775 B2
(45) Date of Patent: Nov. 17, 2009

(54) IMAGE FORMING SYSTEM WITH DENSITY CONVERSION BASED ON IMAGE CHARACTERISTICS AND AMOUNT OF COLOR SHIFT

(75) Inventors: Hiroki Kitamura, Kawasaki (JP);
Yoshiyuki Akiba, Yokohama (JP);
Tsutomu Takata, Yokohama (JP);
Shuichi Nakamura, Kawasaki (JP);
Yusuke Yamamoto, Ohta-ku (JP);
Masanao Motoyama, Tama (JP);
Takeshi Akiyama, Meguro-ku (JP);
Kenzo Tojima, Suginami-ku (JP);
Takaaki Nagaoka, Hatano (JP)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 11/613,644

(22) Filed: Dec. 20, 2006

(65) Prior Publication Data

US 2007/0139664 A1    Jun. 21, 2007

(30) Foreign Application Priority Data

Dec. 21, 2005   (JP)   ............................. 2005-368244

(51) Int. Cl.
*H04N 1/50* (2006.01)
*H04N 1/58* (2006.01)

(52) U.S. Cl. .................. 358/1.9; 358/2.1; 358/3.21; 358/3.26; 358/504; 358/521; 358/524; 358/530

(58) Field of Classification Search ............... 358/1.9, 358/2.1, 3.21, 3.23, 3.24, 3.26, 501, 504, 358/518, 521, 523, 524, 530, 532, 540
See application file for complete search history.

(56) References Cited

U.S. PATENT DOCUMENTS

| 5,715,498 | A | 2/1998 | Takeuchi et al. |
| 6,204,933 | B1 | 3/2001 | Yoshino et al. |
| 7,002,701 | B1 | 2/2006 | Nakayasu et al. |
| 7,130,080 | B2* | 10/2006 | Kubo .......................... 358/2.1 |
| 2009/0213401 | A1* | 8/2009 | Higashiyama et al. ....... 358/1.9 |

FOREIGN PATENT DOCUMENTS

| JP | 64-40956 A | 2/1989 |
| JP | 8-85237 A | 4/1996 |
| JP | 11-98343 A | 4/1999 |
| JP | 2000-177170 A | 6/2000 |
| JP | 2007108586 A * | 4/2007 |

* cited by examiner

*Primary Examiner*—Scott A Rogers
(74) *Attorney, Agent, or Firm*—Canon U.S.A. Inc. I.P. Division

(57) ABSTRACT

An image forming system includes an information processing apparatus and an image forming apparatus. The information processing apparatus performs image generation, color conversion, and extraction of image characteristics to generate compressed data. The image forming apparatus decompresses the compressed data and determines a writing address into an image data storing unit on the basis of an amount of shift to convert the density of the image data in fractional pixel units.

9 Claims, 22 Drawing Sheets

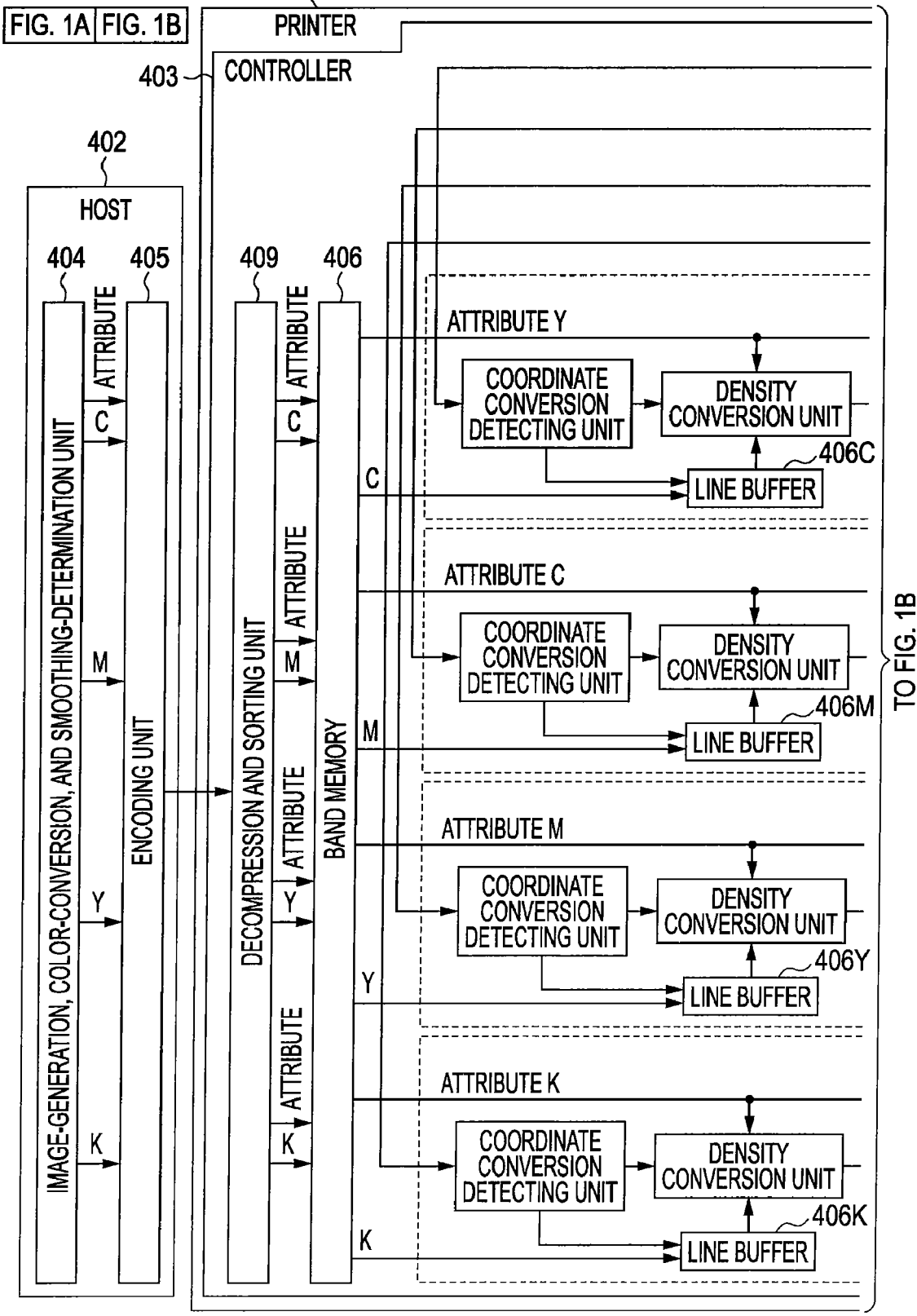

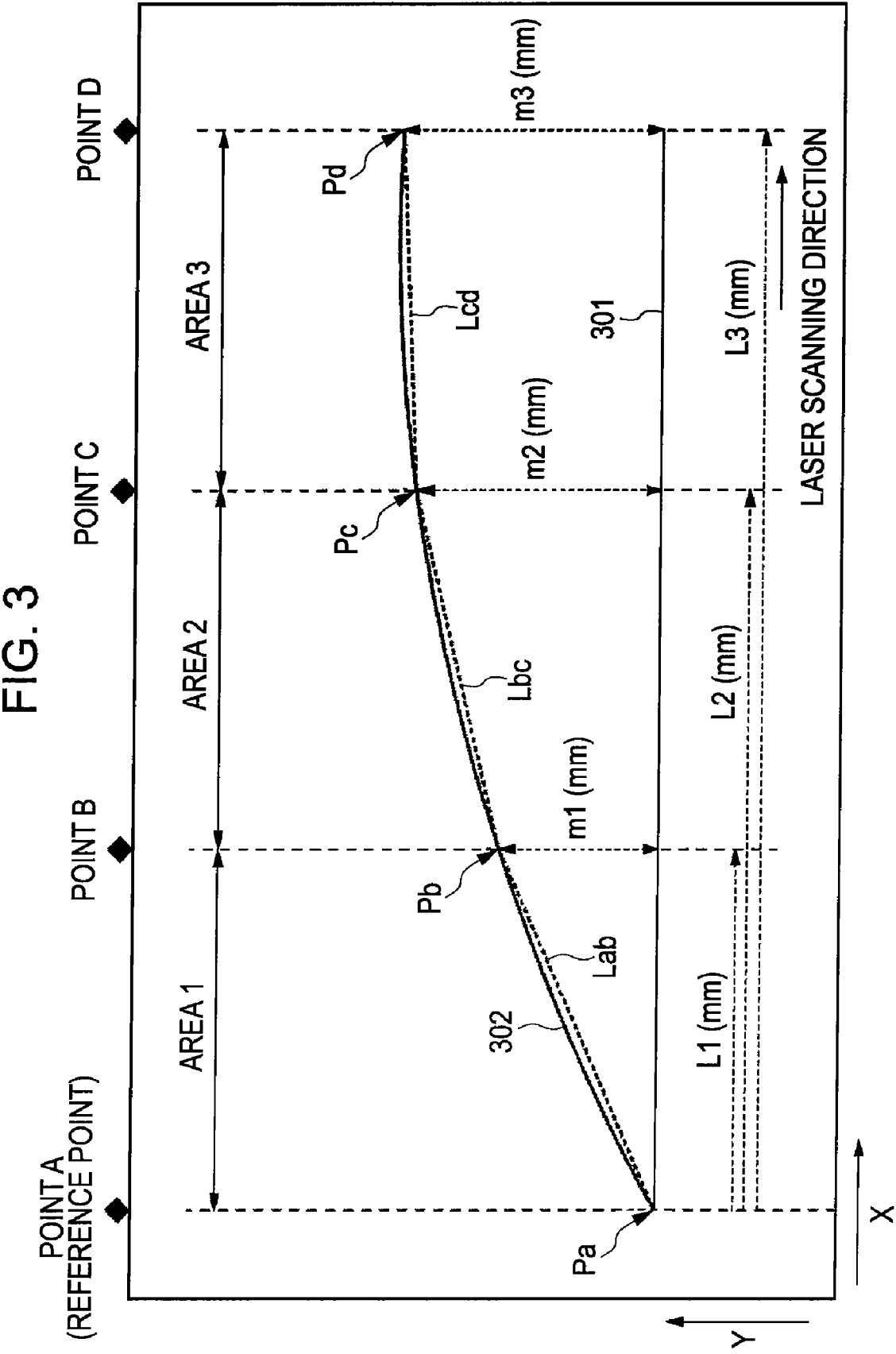

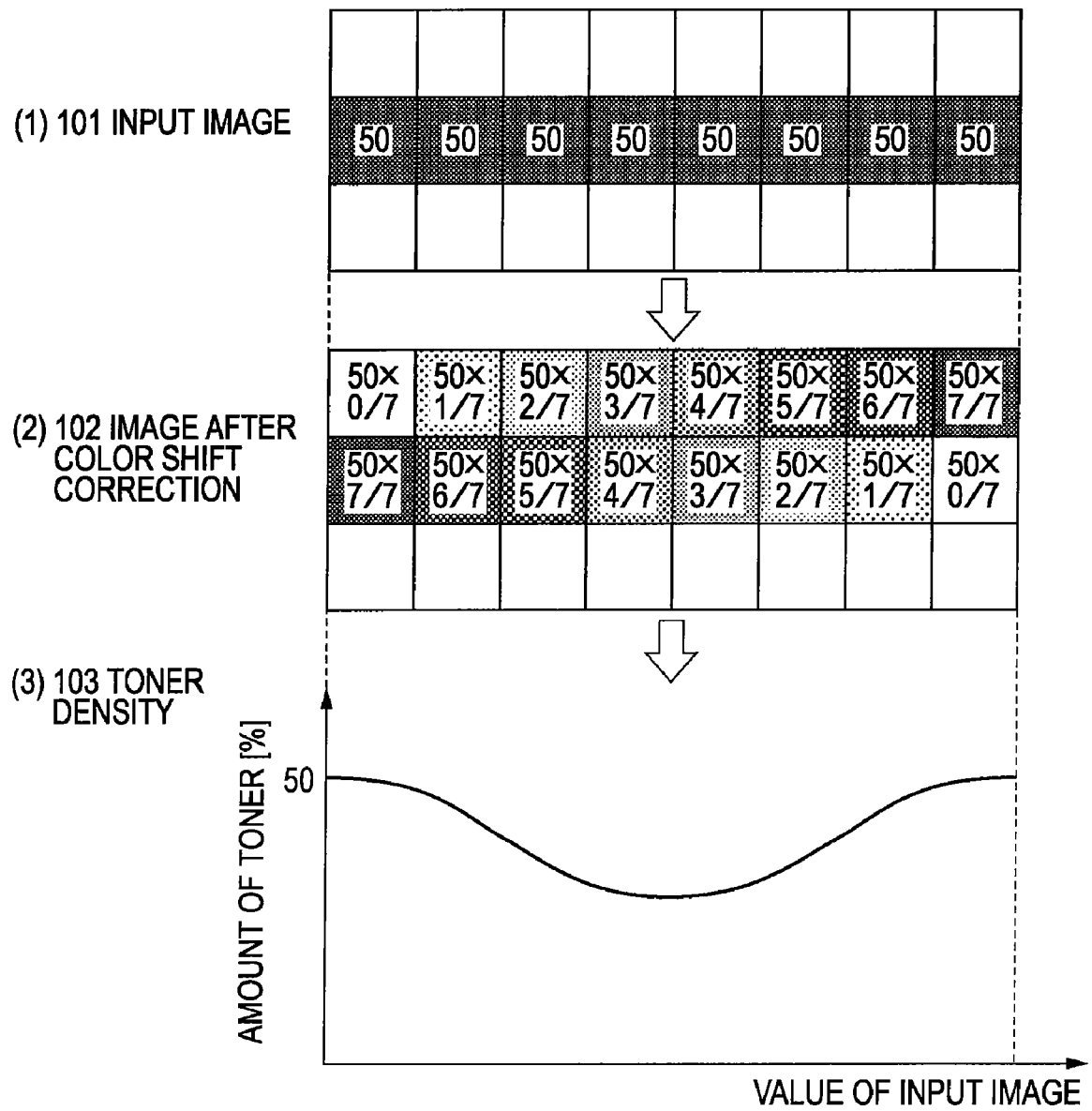

FIG. 7A
AMOUNT OF SHIFT
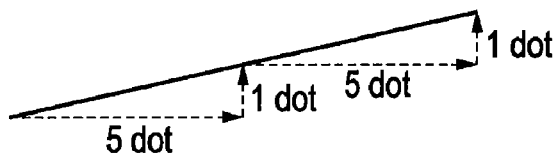
FIG. 7B
BITMAP IMAGE
(BEFORE DENSITY CONVERSION)
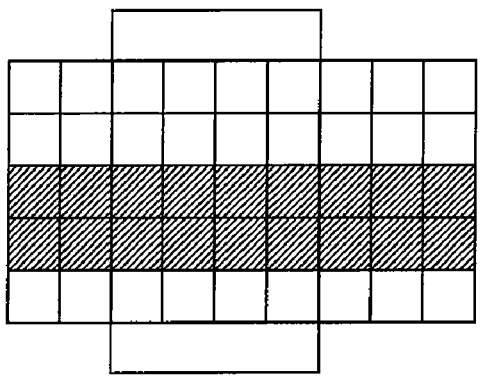
FIG. 7C
CORRECTED BITMAP IMAGE
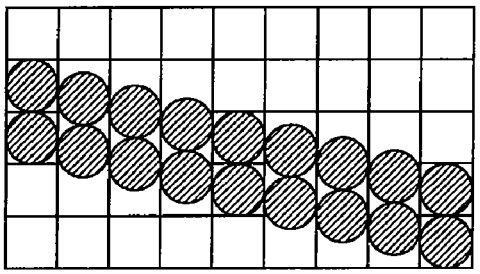
FIG. 7D
AMOUNT OF CORRECTION TABLE
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| β = Δy−k | 0 | 0.25 | 0.5 | 0.75 | 0 | 0.25 | 0.5 | 0.75 | 0 |
| α = 1−β | 1 | 0.75 | 0.5 | 0.25 | 1 | 0.75 | 0.5 | 0.25 | 1 |
FIG. 7E
BITMAP IMAGE
(AFTER DENSITY CONVERSION)
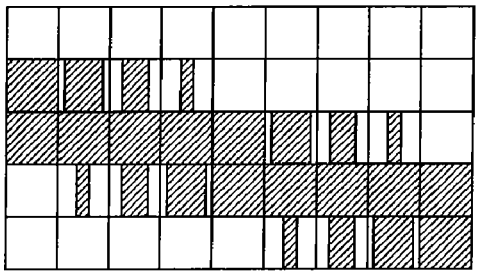
FIG. 7F
EXPOSED IMAGE
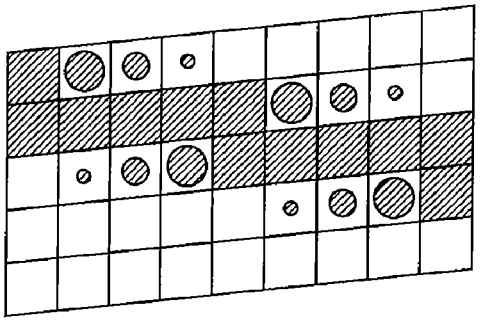

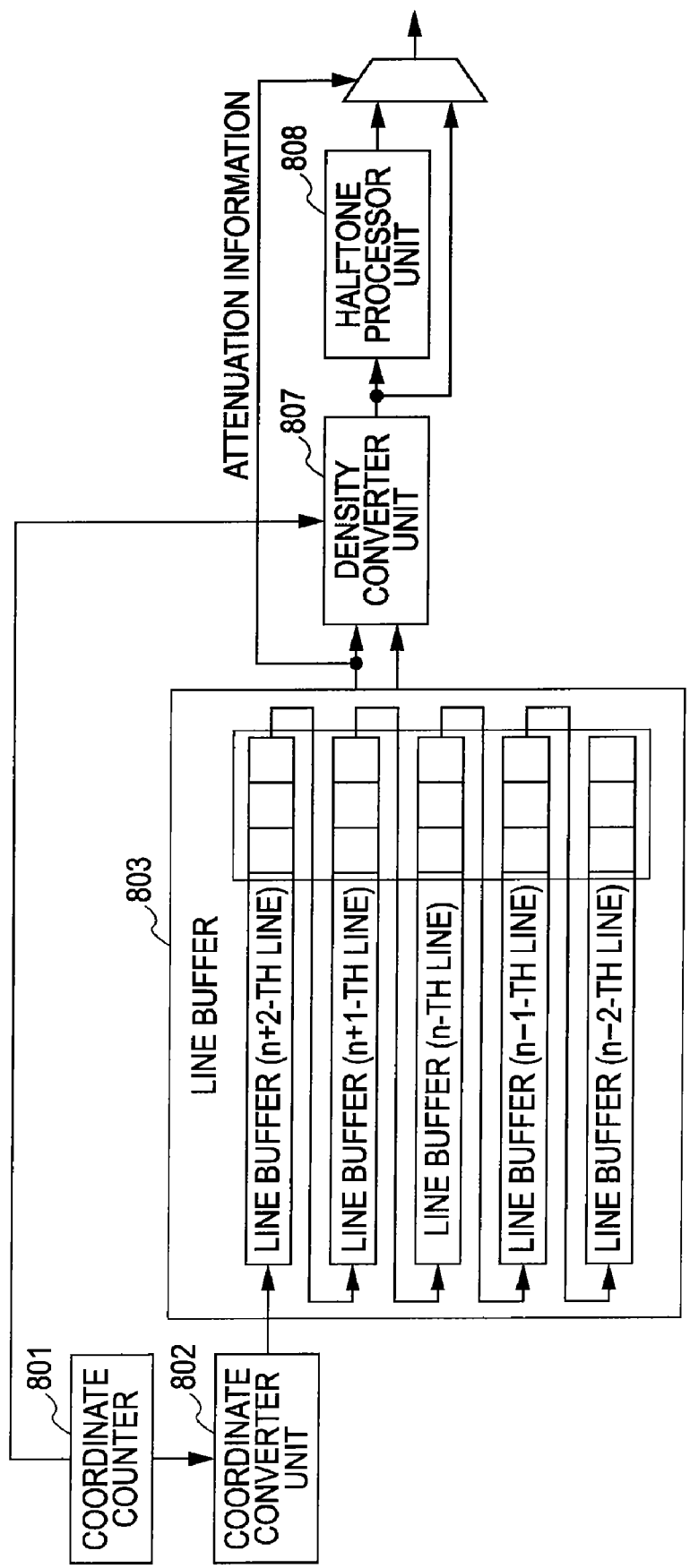

50%

⬇ HALFTONING

⟹ COLOR SHIFT CORRECTION

FIG. 11
(1) INPUT IMAGE
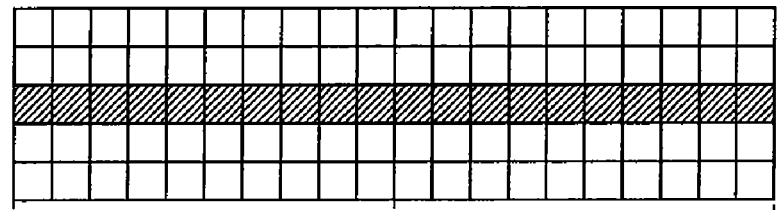
(2) IMAGE AFTER COORDINATE CONVERSION
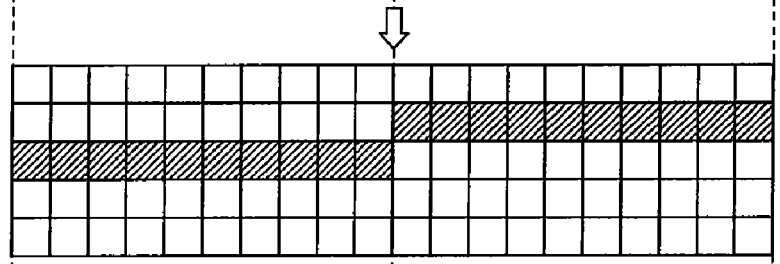
(3) IMAGE AFTER COLOR SHIFT CORRECTION
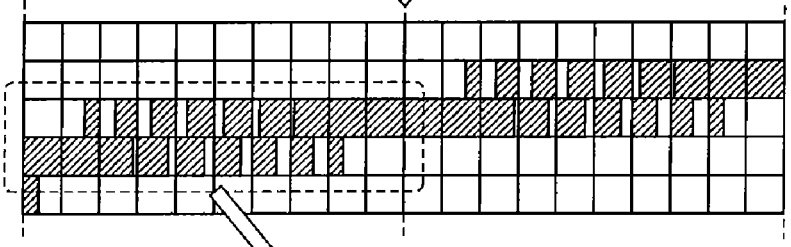
HALFTONING
(4) IMAGE AFTER HALFTONING
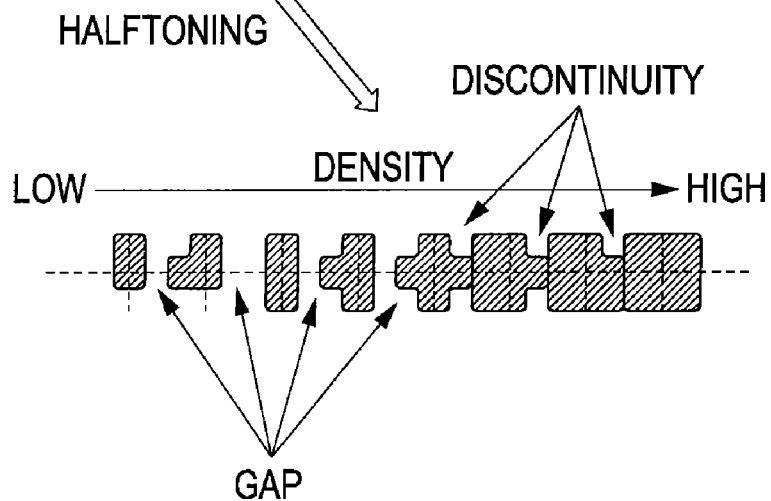

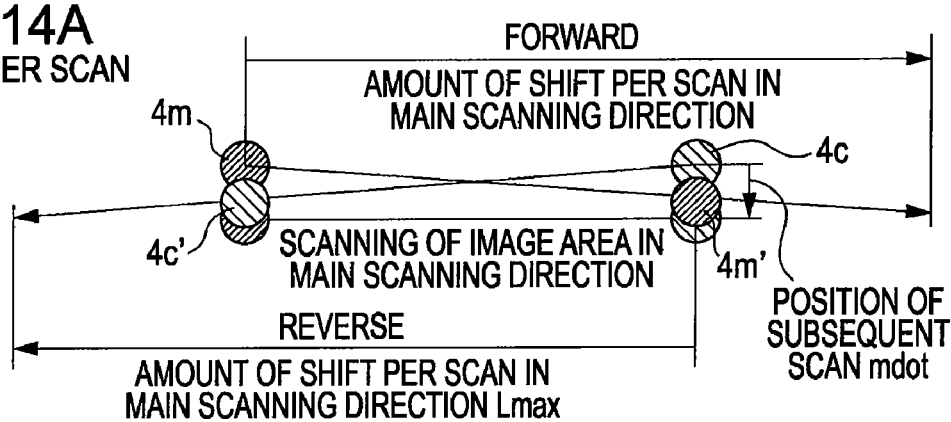
FIG. 14A ONE DOT PER SCAN
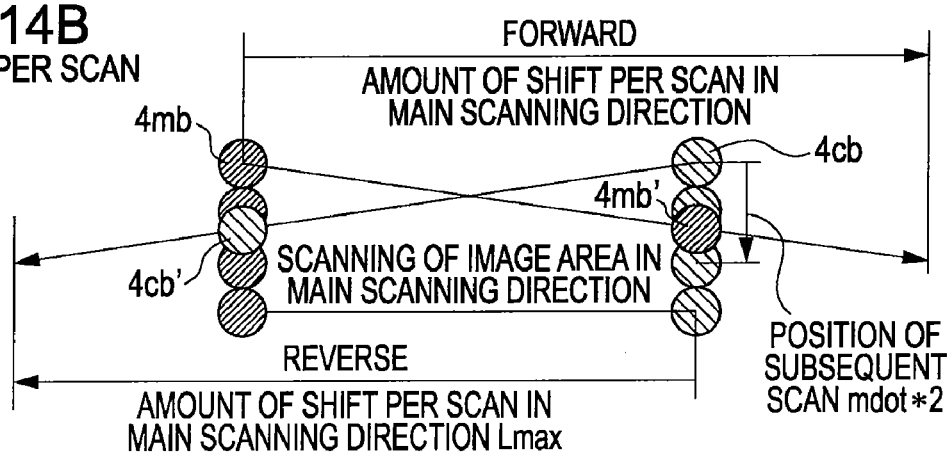
FIG. 14B TWO DOTS PER SCAN
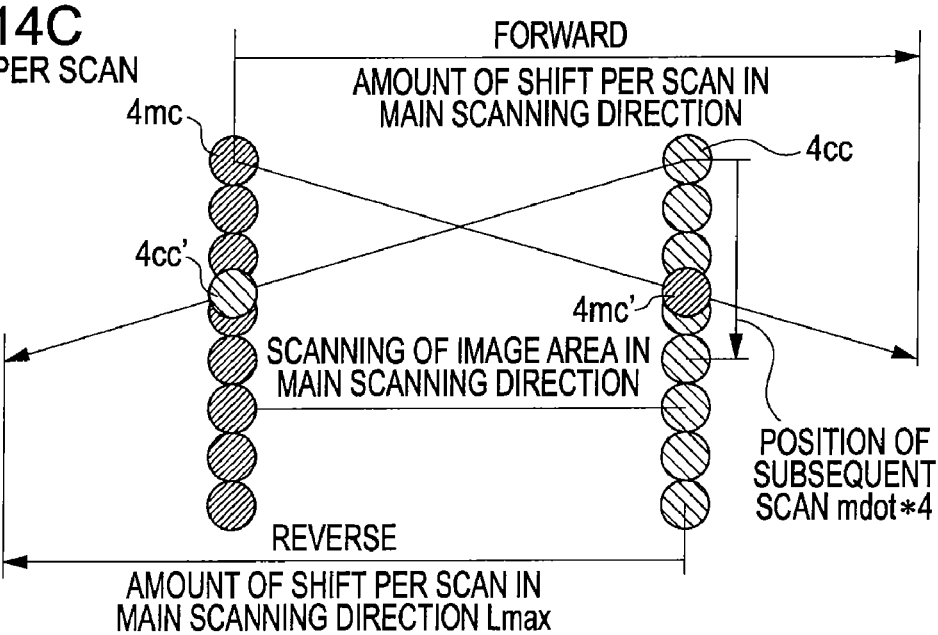
FIG. 14C FOUR DOTS PER SCAN

STANDARD SPEED

1/2x SPEED

2x SPEED

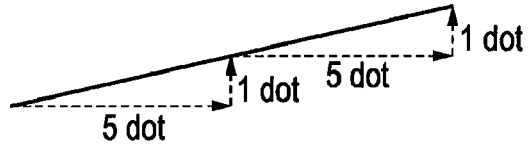
FIG. 18A
AMOUNT OF SHIFT
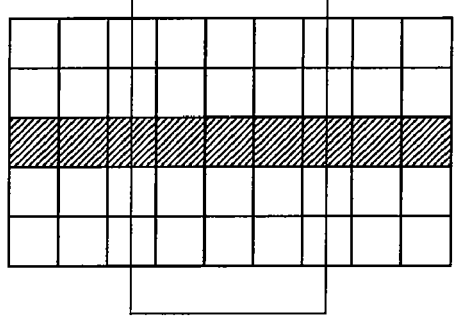
FIG. 18B
BITMAP IMAGE
(BEFORE DENSITY CONVERSION)
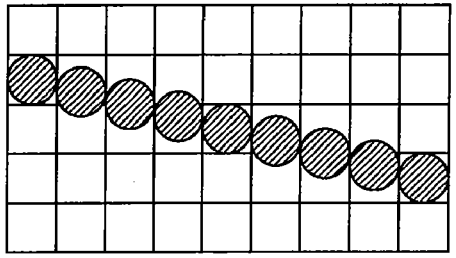
FIG. 18C
CORRECTED BITMAP IMAGE
FIG. 18D
AMOUNT OF CORRECTION TABLE
| $\Delta y$ | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| $\beta = 1.2 (\Delta y - k)$ | 0 | 0.3 | 0.6 | 0.9 | 0 | 0.3 | 0.6 | 0.9 | 0 |
| $\alpha = 1.2 - \beta \ (1 \geq \alpha \geq 0)$ | 1 | 0.9 | 0.6 | 0.3 | 1 | 0.9 | 0.6 | 0.3 | 1 |
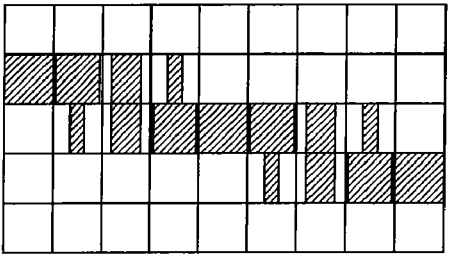
FIG. 18E
BITMAP IMAGE
(AFTER DENSITY CONVERSION)
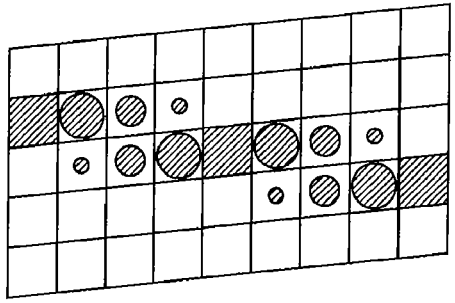
FIG. 18F
EXPOSED IMAGE

FIG. 19A
AMOUNT OF SHIFT
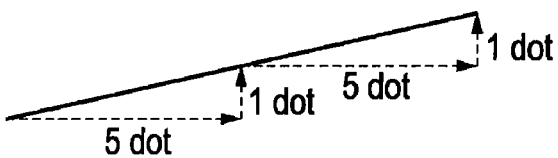
FIG. 19B
BITMAP IMAGE
(BEFORE DENSITY CONVERSION)
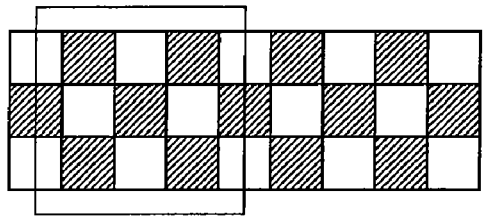
FIG. 19C
CORRECTED BITMAP IMAGE
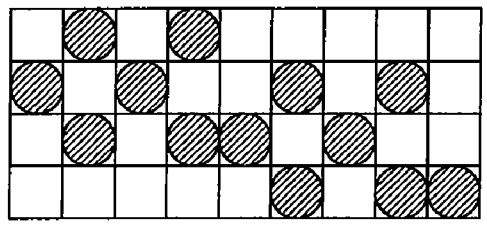
FIG. 19D
AMOUNT OF CORRECTION TABLE
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| $\beta = 0$ | 0 | 0 | 0 | 0 | 0 | 0 | 0 | 0 | 0 |
| $\alpha = 1$ | 1 | 1 | 1 | 1 | 1 | 1 | 1 | 1 | 1 |
FIG. 19E
BITMAP IMAGE
(AFTER DENSITY CONVERSION)
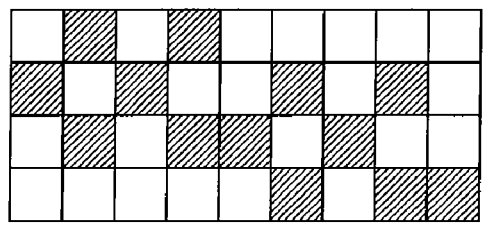
FIG. 19F
EXPOSED IMAGE
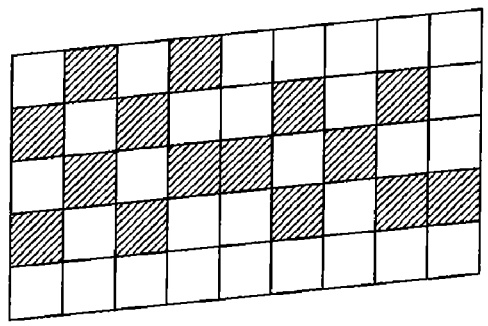

FIG. 20A
AMOUNT OF SHIFT
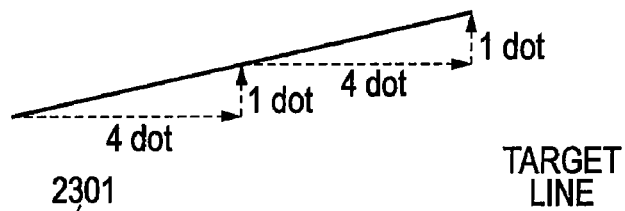
FIG. 20B
BITMAP IMAGE
(BEFORE COORDINATE CONVERSION)
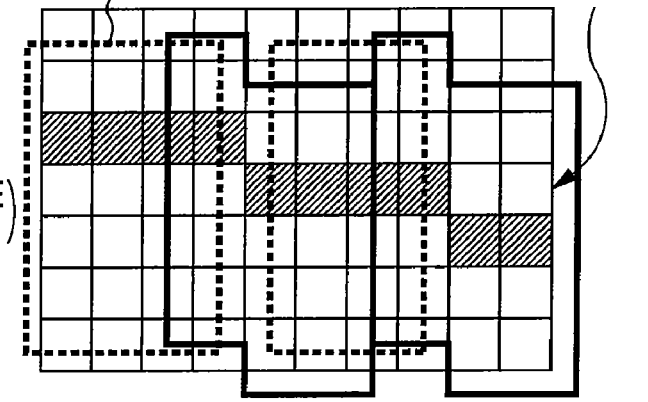
FIG. 20C
CORRECTED BITMAP IMAGE
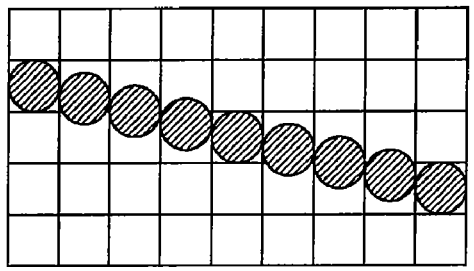
FIG. 20D
AMOUNT OF CORRECTION TABLE
| $\Delta y$ | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| $\beta = 1.2\,(\Delta y - k)$ | 0 | 0.3 | 0.6 | 0.9 | 0 | 0.3 | 0.6 | 0.9 | 0 |
| $\alpha = 1.2 - \beta\ (1 \geq \alpha \geq 0)$ | 1 | 0.9 | 0.6 | 0.3 | 1 | 0.9 | 0.6 | 0.3 | 1 |
FIG. 20E
BITMAP IMAGE
(AFTER DENSITY CONVERSION)
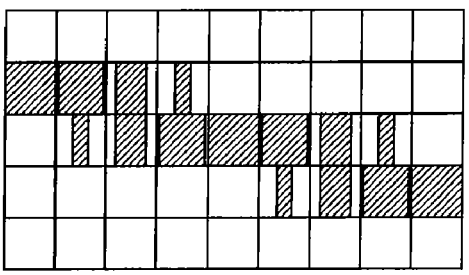
FIG. 20F
EXPOSED IMAGE
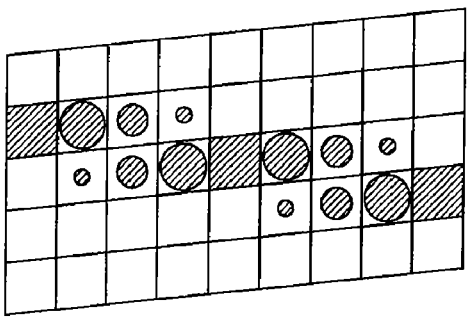

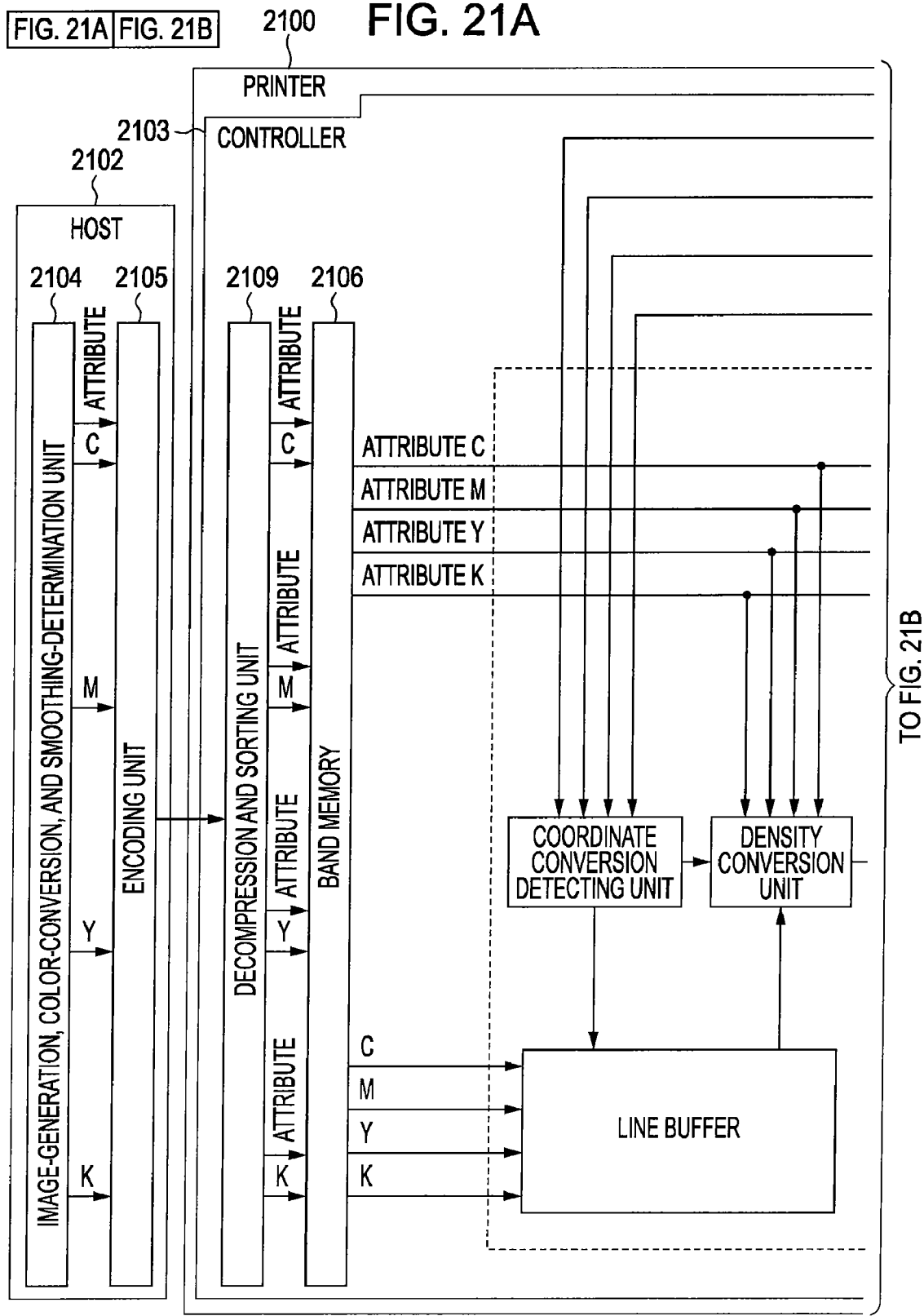

IMAGE FORMING SYSTEM WITH DENSITY CONVERSION BASED ON IMAGE CHARACTERISTICS AND AMOUNT OF COLOR SHIFT

BACKGROUND OF THE INVENTION

1. Field of the Invention

The present invention relates to a color image printing system. It relates particularly, though not exclusively, to a system including a color image forming apparatus that sequentially transfers images of colors formed on multiple image carriers that are arranged side by side to a storage medium that is being fed to form a color image, and a color-image-data generating apparatus that supplies data to the color image forming apparatus.

2. Description of the Related Art

Color image forming apparatuses, such as printers adopting electrophotography, generally employ a method of forming a full-color image by developing images of colors using multiple developing units for one photosensitive member, repeating an exposure-development-transfer process several times to superimpose the images of different colors on one sheet of transfer paper in order to form a color image, and fixing the color image.

Japanese Patent Laid-Open No. 11-98343 discloses a method of transferring compressed data to a printer of the above type, decompressing the data, and supplying the decompressed data to the printer engine.

It is known that an image can be distorted depending on the manufacturing accuracy of the exposing unit in such a printer to cause a color shift. In order to prevent the color shift, methods are proposed in which a test toner image is formed on a sheet of transfer paper or on a carrying belt in a transfer unit, and the test toner image is detected to correct the optical path of each optical system or to correct the writing start position of the image of each color on the basis of the detection result (for example, refer to Japanese Patent Laid-Open No. 64-40956 and Japanese Patent Laid-Open No. 2000-177170).

Japanese Patent Laid-Open No. 8-85237 discloses an apparatus that automatically converts the coordinate position where the image data of each color is output into the coordinate position of which any registration error is corrected. In this apparatus, a correcting unit corrects the position of a modulated light beam in units smaller than the minimum dot unit of a color signal on the basis of the image data of each color whose coordinate position is converted.

In order to correct the optical path of an optical system, it is necessary to mechanically operate the correction optical system (including a light source and an f-θ lens) and mirrors in the optical path to align the positions of the test toner images. For this alignment, a more precise movable member is required, thus increasing the cost of the apparatus. In addition, since it takes a long time to complete the correction, it is impossible to frequently perform the correction. Furthermore, any shift in the length of the optical path can be varied with time due to a variation in the temperature of the apparatus. In such a case, it is difficult to prevent any color shift by correcting the optical path of the optical system.

In the correction of the writing start position of an image, there is a problem in that it is not possible to correct any tilt of the optical system or to correct any magnification error caused by a shift in the length of the optical path, although any positional shift at the left end and at the upper left corner can be corrected.

In the apparatus disclosed in Japanese Patent Laid-Open No. 8-85237, there is a problem in that the correction of the coordinate position where the image data of each color is output in an image that has been subjected to halftoning can degrade the reproducibility of the dots in the halftone image to cause unevenness in color and to make Moire patterns obvious. FIG. 4 illustrates an example of the unevenness in color. Referring to FIG. 4, an input image 101 has a uniform density. When an image 102 given by performing color-shift correction to the input image 101 is printed, a linear relationship is not established between the value of the input image 101 and a toner density 103. Accordingly, an image having uneven densities is printed after the color-shift correction although the input image 101 has a uniform density. If such uneven densities are periodically repeated, there are problems in that Moire patterns are made obvious and, therefore, fine color images are not generated.

A photosensitive member which laser beams scan does not stop but moves by a predetermined amount corresponding to the printing conditions during the scanning by the laser beams with the increasing printing speed. If the laser beams of different colors have the same scanning direction, any tilt of the scanning line caused by the movement of the photosensitive member produces no problem. However, if the laser beams of different colors have different scanning directions, an unevenness in color can be caused depending on the amount of the movement of the photosensitive member. The amount of the movement of the photosensitive member can vary depending on the conditions of the printing medium and, therefore, it is not possible to correct the unevenness in color by a single process.

In the methods disclosed in Japanese Patent Laid-Open No. 64-40956 and Japanese Patent Laid-Open No. 2000-177170, all the data transmitted from the hosts is received and, then, the reading position of the data is adjusted in accordance with the bend characteristics of an apparatus that outputs the data to reproduce the image data. In high-speed printing using these methods, it is necessary to store all the images in a memory and to adjust any time lag of the photosensitive drum. Accordingly, it becomes difficult to reduce the cost of the printing apparatus because the memory of the printing apparatus is increased in size. In addition, an improvement in the resolution of the printing apparatus increases the size of the memory by the resolution ratio squared.

The method for a printing system, disclosed in Japanese Patent Laid-Open No. 11-98343, takes a reduction in the memory size into consideration. However, the method does not refer to a data transfer method in accordance with the bend characteristics of the output apparatus.

As described above, image forming systems suitable for high-speed electrophotographic color printers are not proposed at lower costs.

In order to resolve the above problems, an input image is divided into blocks and any positional shift of each block is corrected in units not less than pixels on the basis of an amount of correction of color shift, calculated by an amount-of-correction of color-shift calculating unit. Then, any color shift of the image that is subjected to the positional shift correction is corrected in units less than pixels and the halftoning is performed to the image that is subjected to the color shift correction to eliminate Moire patterns that can be produced in the color shift correction. However, the halftoning of the image that has been subjected to the color shift correction can cause jagged edges of the image and fine lines cannot be correctly reproduced.

SUMMARY OF THE INVENTION

The present invention provides a system suitable for a printing apparatus capable of selectively performing density conversion or halftoning in accordance with the characteristics of an image to provide the image with less degradation in the image quality and capable of high-speed processing by using existing attribute information about the image.

According to an embodiment of the present invention, an image forming system includes an information processing apparatus and an image forming apparatus. The information processing apparatus includes a first density conversion unit that converts the pixel density of pixel data on the basis of an amount of color shift in units less than pixels, among amounts of correction of color shift; an image-characteristics-information storing unit in which image characteristics information used in the first density conversion unit is stored; and a transferring unit that transfers the image characteristics information and the pixel data to the image forming apparatus. The image forming apparatus includes an image forming unit including an image carrier, an exposure section emitting light to which the image carrier is exposed, and a developing section developing an electrostatic latent image resulting from the exposure on a recording medium; an amount-of-color-shift storing unit that stores information concerning an amount of color shift in a secondary scanning direction at an exposure position in scanning of the image carrier in a main scanning direction; an amount-of-correction of color-shift calculating unit that calculates an amount of correction of color shift in the secondary scanning direction on the basis of the amount of color shift; an image data storing unit in which image data including multiple pieces of the pixel data is written; a coordinate conversion unit that converts the coordinate of a writing address used in the writing in the image data storing unit, on the basis of an amount of color shift in units of pixels among the amounts of correction of color shift, and reads out the pixel data concerning a target pixel from the image data storing unit in accordance with address information after the coordinate conversion; and a second density conversion unit that converts the pixel density of the pixel data on the basis of the image characteristics information and the amount of color shift in units less than pixels among the amounts of correction of color shift.

The image forming apparatus may further include a data decompressing unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 1A and 1B show an example of the structure of an image forming system according to a first embodiment of the present invention.

FIG. 3 illustrates shifts in a main scanning line on a photosensitive drum, according to the first embodiment of the present invention.

FIG. 4 illustrates an example of unevenness in color in an example in related art.

FIG. 5 shows examples of information stored in an amount-of-color-shift storing unit according to the first embodiment of the present invention.

FIGS. 7A to 7F show how a density conversion unit corrects an amount of color shift in units less than pixels, according to the first embodiment of the present invention.

FIG. 8 is a block diagram showing an example of the structure of a color shift correcting unit, according to the first embodiment of the present invention.

FIG. 11 shows an image resulting from the halftoning of an edge image, according to the first embodiment of the present invention.

FIGS. 14A to 14C show how to determine the amount of shift when the scanning direction and the number of dots are varied, according to the first embodiment of the present invention.

FIGS. 18A to 18F show how to process a fine line, according to the first embodiment of the present invention.

FIGS. 19A to 19F show how to process a repeating pattern, according to the first embodiment of the present invention.

FIGS. 20A to 20F show how to process a smoothing pattern window, according to the first embodiment of the present invention.

FIGS. 21A and 21B show an example of the structure of an image forming system according to a second embodiment of the present invention.

DESCRIPTION OF THE EMBODIMENTS

First Exemplary Embodiment

Preferred embodiments of the present invention will now be described in detail, in accordance with the accompanying drawings.

First Exemplary Embodiment

Figure 1B:
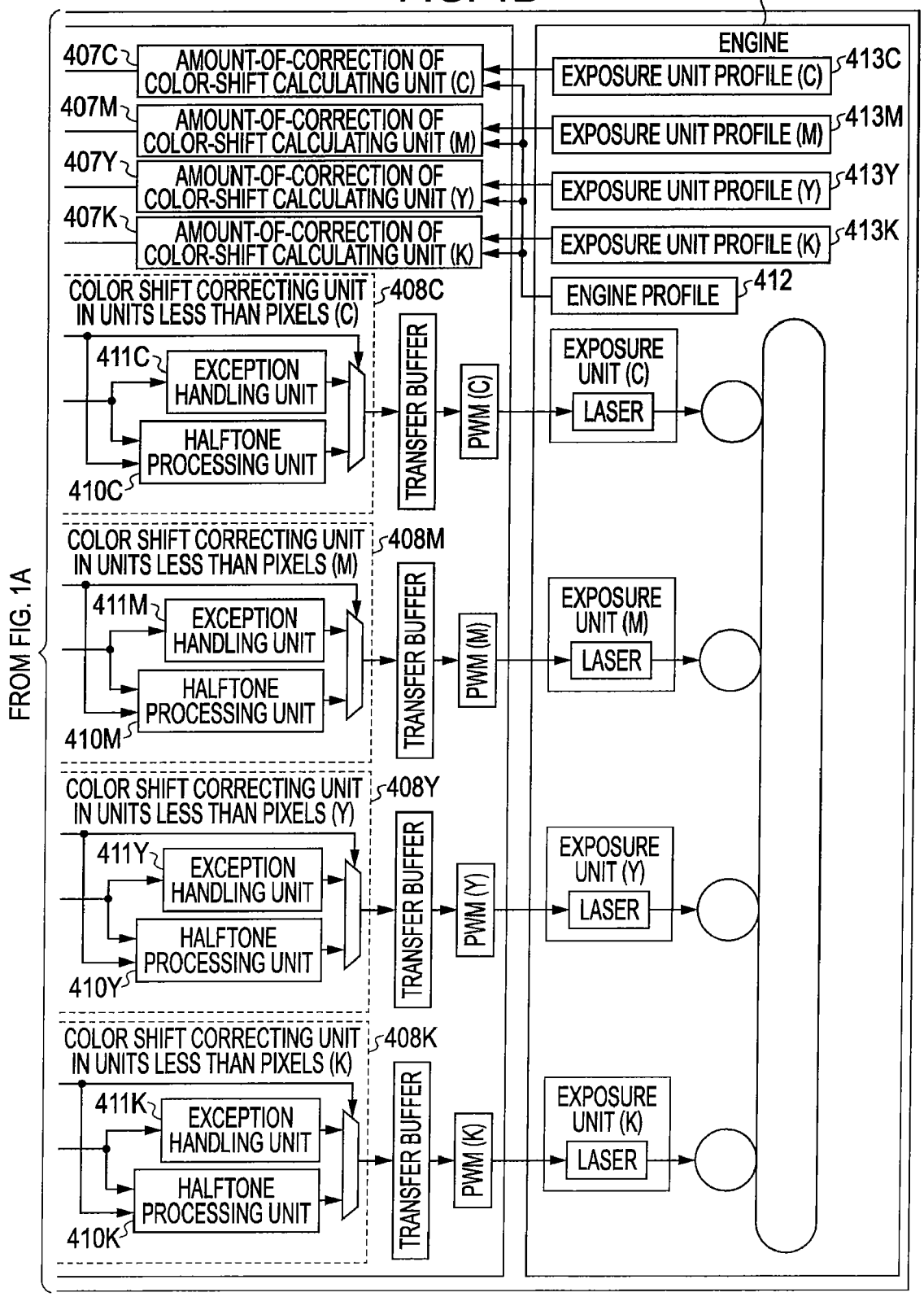

FIGS. 1A and 1B show an example of the structure of an image forming system according to a first embodiment of the present invention.

The image forming system includes a printer 400 and a host 402 connected to each other. The printer 400 includes a controller 403 and an engine 401.

Figure 2:
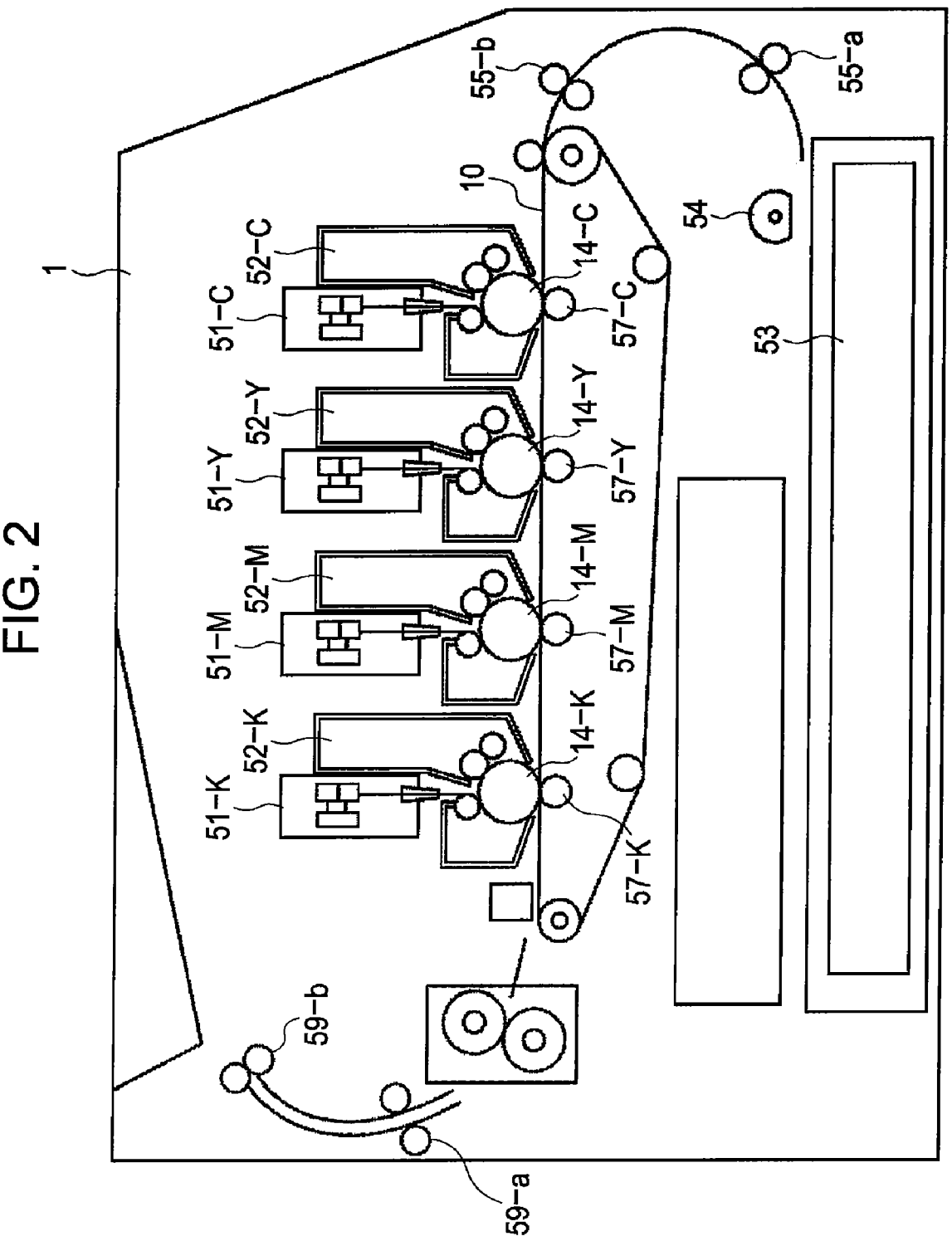
FIG. 2 is a cross-sectional view schematically showing an example of the structure of a color image forming apparatus according to the first embodiment of the present invention.

An exemplary operation of the engine 401 according to the first embodiment of the present invention will now be described. FIG. 2 is a cross-sectional view schematically showing an example of the structure of a color image forming apparatus 1 according to the first embodiment of the present invention. The color image forming apparatus 1 is, for example, a color laser beam printer having four photosensitive drums. The color image forming apparatus 1 includes a transfer medium cassette 53 mounted in the bottom portion at the right side of the color image forming apparatus 1. Sheets of the transfer medium are pulled out from the transfer medium cassette 53 one by one by a paper feed roller 54 and the pulled-out sheet of transfer medium is supplied to an image forming unit through a pair of feed rollers 55-*a* and 55-*b*. The image forming unit includes a transfer feed belt 10 on which the transfer medium is fed. The transfer feed belt 10 is stretched in the direction in which the transfer medium is fed (from right to left in FIG. 2) by multiple rotating rollers. The transfer medium is electrostatically attracted to the transfer feed belt 10 in the uppermost stream thereof. The image forming unit also includes four photosensitive drums 14-C, 14-Y, 14-M, and 14-K (collectively referred to as photosensitive drums 14) serving as drum-shaped image carriers. The photosensitive drums 14 are opposed to the feeding surface of the transfer feed belt 10 and are arranged in a straight line.

The image forming unit further includes developing units 52-C, 52-Y, 52-M, and 52-K (collectively referred to as developing units 52). The developing units 52-C, 52-Y, 52-M, and 52-K include the photosensitive drums 14-C, 14-Y, 14-M, and 14-K; the color toner of cyan (C), yellow (Y), magenta (M), and black (K); the charging units; and the developing units, respectively. The charging unit and the developing unit in each of the developing units 52 are arranged a predetermined distance apart. The outer surfaces of the photosensitive drums 14 are charged through the predetermined distance. The charged outer surfaces of the photosensitive drums 14 are exposed to light emitted from exposing units 51-C, 51-Y, 51-M, and 51-K (collectively referred to as exposing units 51), which are laser scanners, in accordance with image information to form electrostatic latent images. The developing units transfer the toner to lower-voltage areas in the electrostatic latent images to form (develop) toner images.

Transfer members 57-C, 57-Y, 57-M, and 57-K (collectively referred to as transfer members 57) are opposed to the photosensitive drums 14-C, 14-Y, 14-M, and 14-K with the feeding surface of the transfer feed belt 10 sandwiched therebetween. The toner images formed (developed) on the outer surfaces of the photosensitive drums 14 are attracted and transferred to the surface of the transfer medium owing to the electric charge occurring on the fed transfer medium and the transfer electric field produced by the transfer members 57 corresponding to the photosensitive drums 14. The transfer medium to which the toner images are transferred is discharged outside by a pair of paper output rollers 59-*a* and 59-*b*. The transfer feed belt 10 may be an intermediate transfer belt to which the toner of colors (cyan (C), yellow (Y), magenta (M), and black (K)) is temporarily transferred. The toner is, then, secondarily transferred from the intermediate transfer belt to the transfer medium.

FIG. 3 illustrates shifts between an ideal scanning line and an actual scanning line in the main scanning direction on the photosensitive drums 14, which are the image carriers. Referring to FIG. 3, reference numeral 301 denotes an ideal main scanning line perpendicular to the rotating direction of the photosensitive drums 14. Reference numeral 302 denotes an actual main scanning line that is sloped upward and curved. The upward slope and curvature are caused by any shift in the positional accuracy or diameter of the photosensitive drums 14 and any shift in the positional accuracy of the optical system in the exposing unit 51 of each color. If such upward slope and curvature of the main scanning line exist in the image station of any color, color shift occurs in the collective transfer of the toner images of multiple colors to the transfer medium. According to the first embodiment of the present invention, the amount of shift in the secondary scanning direction between the ideal main scanning line 301 and the actual main scanning line 302 is measured at multiple points (points B to D) in the main scanning direction (X direction). A point A where the scanning of a printing area is started is used as the reference point. The printing area is divided into multiple areas (an area 1 between a point Pa and a point Pb, an area 2 between the point Pb and a point Pc, and an area 3 between the point Pc and a point Pd), and the slope of the main scanning line in each area is approximated to straight lines (Lab, Lbc, and Lcd) between the points. Accordingly, if the difference of the amounts of shift between the points ("m1" for the area 1, "m2−m1" for the area 2, and "m3−m2" for the area 3) has a positive value, the main scanning line in the area slopes upward. If the difference of the amounts of shift between the points has a negative value, the main scanning line in the area slopes downward.

Exposure unit profiles 413C, 413M, 413Y, and 413K in FIGS. 1A and 1B are amount-of-color-shift storing units of the four colors (cyan, magenta, yellow, and black). The exposure unit profiles 413C, 413M, 413Y, and 413K store the amounts of color shift in the areas of the main scanning lines in respective colors. According to the first embodiment of the present invention, the amounts of shift in the secondary scanning direction between the ideal main scanning line 301 and the actual main scanning line 302 at the multiple points, described above with reference to FIG. 3, are stored in the amount-of-color-shift storing units 413C, 413M, 413Y, and 413K as information indicating the slope and curvature of the main scanning line.

FIG. 5 shows examples of information stored in the amount-of-color-shift storing units 413C, 413M, 413Y, and 413K. Although the amounts of shift between the ideal main scanning line 301 and the actual main scanning line 302 are stored in the amount-of-color-shift storing units 413C, 413M, 413Y, and 413K in the first embodiment of the present invention, other information may be stored in the amount-of-color-shift storing units 413C, 413M, 413Y, and 413K as long as the information can be used to determine the slope and curvature of the actual main scanning line 302. The amounts of shift measured in the manufacturing process of the apparatus may be stored in the amount-of-color-shift storing units 413C, 413M, 413Y, and 413K as information specific to the apparatus. Alternatively, the amounts of shift detected by a detecting mechanism in the apparatus on the basis of a predetermined pattern used for measuring any shift for every image carrier of each color may be stored in the amount-of-color-shift storing units 413C, 413M, 413Y, and 413K.

A method of correcting any color shift in the image forming system will now be described. In the image forming system according to the first embodiment of the present invention, the controller 403 in the printer 400 generates data for exposure by processing the data generated by the host 402, laser beams are emitted from exposure units in the engine 401, and the image data is finally output on a sheet of paper. In this structure, any shift caused by the slope and distortion of the main scanning line is corrected in two stages.

In the first stage, the slope and distortion is corrected in units of pixels in the following manner. In the host 402, an image-generation, color-conversion, and smoothing determination unit 404 generates image data used for printing from, for example, document, picture, or graphic data in response to an instruction issued from a user and, then, generates CMYK data used in the printer and attribute data of each pixel from the generated image data. The CMYK data and the attribute data are encoded by an encoding unit 405 and the encoded data is supplied to the printer 400. In the printer 400, the controller 403 receives the encoded data and a decompression and sorting unit 409 decompresses the encoded data. Then, a writing address in a band memory 406 is determined on the basis of the amount of shift in units of pixels, calculated in amount-of-correction of color-shift calculating units 407C, 407M, 407Y, and 407K, and the determined writing address is stored in the band memory 406 for every color. This writing address is determined in accordance with an amount of correction to perform the correction in units of pixels.

The amount-of-correction of color-shift calculating units 407C, 407M, 407Y, and 407K calculate amounts of correction of color shift in the secondary scanning direction, corresponding to the coordinate information in the main scanning direction, on the basis of information concerning the amount of shift of the main scanning line, stored in the amount-of-color-shift storing units 413C, 413M, 413Y, and 413K.

The amounts of correction of color shift in the secondary scanning direction in each area in FIG. 3 are calculated in the following equations:

Area 1: $\Delta y1 = x*(m1/L1)$

Area 2: $\Delta y2 = m1/Ldot + (x-(L1/Ldot))*((m2-m1)/(L2-L1))$

Area 3: $\Delta y3 = m2/Ldot + (x-(L2/Ldot))*((m3-m2)/(L3-L2))$ [Formula 1]

where "x" (dot) denotes coordinate data in the main scanning direction, "Δy" (dot) denotes the amount of correction of color shift in the secondary scanning direction, "Ldot" denotes a print density, "L1, L2, and L3" denote distances (in mm) from the print start position to the left ends of the areas 1, 2, and 3 in the main scanning direction, and "m1, m2, and m3" denote amounts of shift between the ideal main scanning line 301 and the actual main scanning line 302 at the left ends of the areas 1, 2, and 3.

The slope in each area can be determined from the deviation at the measurement point. The amount of correction of color shift "ys" is calculated according to any of the following equations by using the data in the exposure unit profile of each pixel in all the areas.

$$\Delta ys = x*(m1/L1)(0 \le x < L1)$$ [Formula 2]
$$= m1/Ldot + (L1 \le x < L1 + L2)(x-(L1/Ldot))*((m2-m1)/(L2-L1))$$
$$= m2/Ldot + (L1+L2 \le x < (x-(L2/Ldot))*L1+L2+L3)((m3-m2)/(L3-L2))$$

where "Ldot" denotes the size of one pixel.

After calculating the amount of correction of color shift "ys", the value of the coordinate data "x" in the main scanning direction is determined at a time when the amount of correction of color shift "ys" reaches one dot reproduced in the printing and a reading position in the vertical direction is varied on the basis of the value of the coordinate data "x" in the main scanning direction.

Engine profile data stored in an engine profile 412 in the engine 401 in FIGS. 1A and 1B includes offset information from the reference point on the sheet of paper, the scanning direction of the beam of each color in the engine 401, the amount of scanning by the scanner, and the number of used beams.

Figure 13:
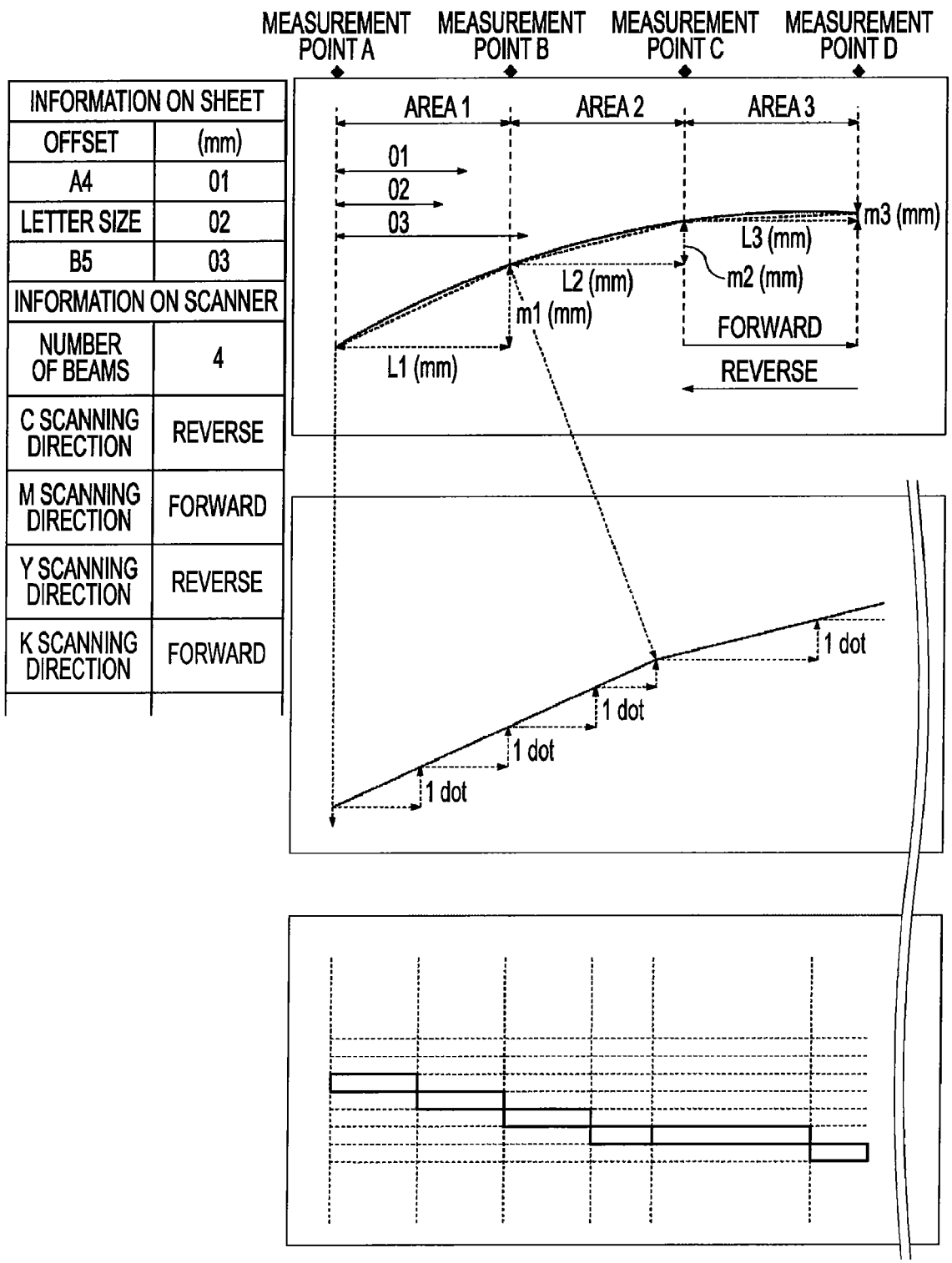
FIG. 13 shows an example of print profile data, according to the first embodiment of the present invention.

FIG. 13 shows an example of the relationship between data in the engine profile and data in the exposure profile. FIGS. 14A to 14C show how to determine the slope when the scanning direction of the beam of each color in the engine 401 is varied between "Forward" or "Reverse" and the number of used beams is varied among one, two, and four.

FIG. 14A shows an example in which one dot is recorded in one scan and the scanning direction in magenta is opposite to that in cyan. FIG. 14B shows an example in which two dots are recorded in one scan. FIG. 14C shows an example in which four dots are recorded in one scan.

Referring to FIG. 14A, although the writing start position of an image is "4m" for magenta and "4c" for cyan, each dot is positioned at "4m'" for magenta and "4c'" for cyan in the scanning of the image area in the main scanning direction because the scanning direction in magenta is opposite to that in cyan. The slope in this positional relationship is calculated by Formula 3.

mdot/Lmax [Formula 3]

where "Lmax" denotes the distance at which the beam moves in one scan and "mdot" denotes the distance between the dots.

The slopes in FIG. 14B and FIG. 14C are calculated according to Formula 4.

two beams: 2*mdot/Lmax four beams: 4*mdot/Lmax [Formula 4]

Accordingly, assuming that the number of beams used in one scan is represented by "n", the slope is calculated according to Formula 5.

n*mdot/Lmax [Formula 5]

When the direction of shift in FIG. 2 is assumed as forward, a slope coefficient with the minus sign is added in the forward movement and a slope coefficient with the plus sign is added in the reverse movement to calculate the slope.

Figure 15A:
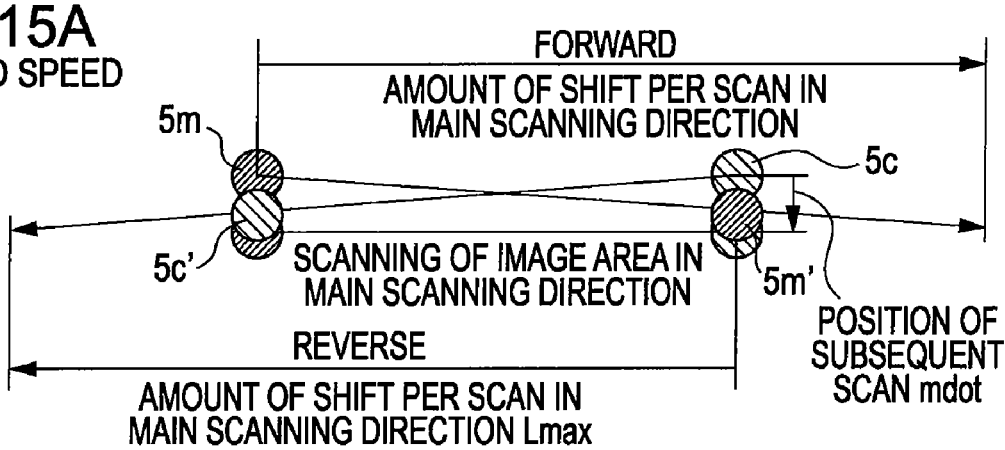
FIGS. 15A to 15C show how to determine the amount of shift when the printing speed is varied, according to the first embodiment of the present invention.
Figure 15B:
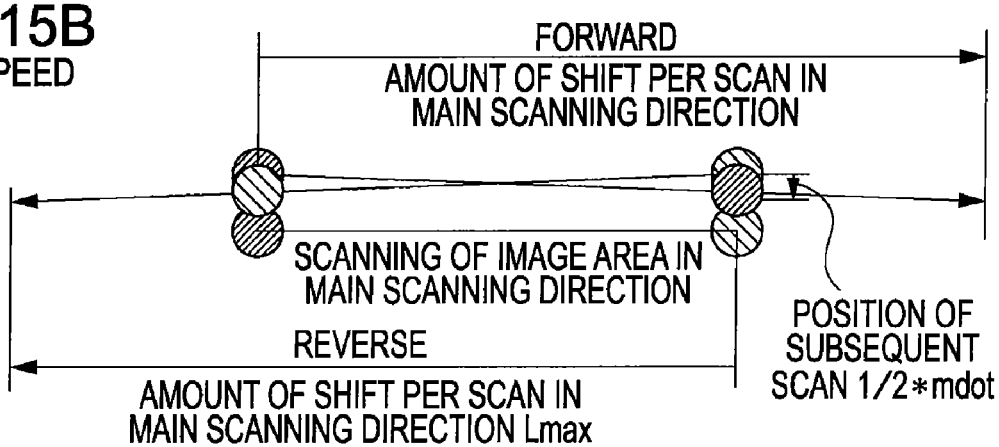
Figure 15C:
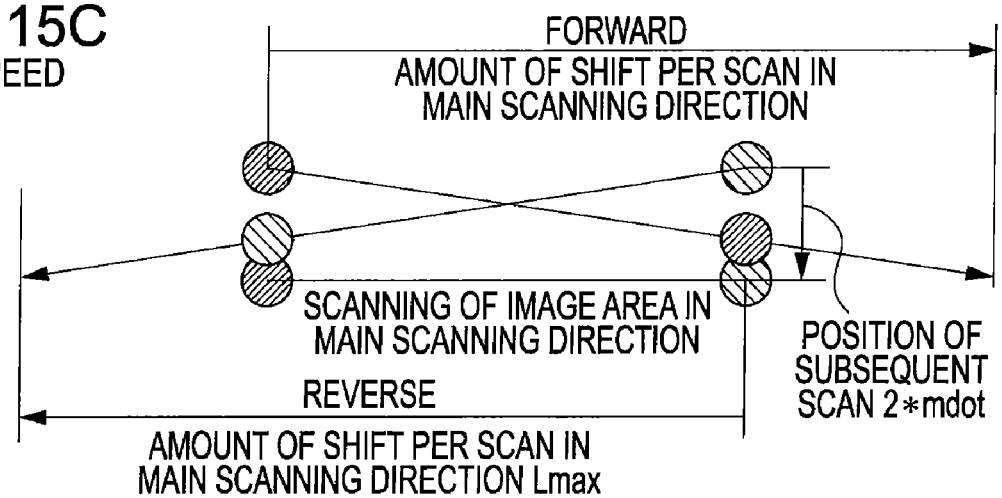

FIGS. 15A to 15C show how to determine the slope when the printing speed is varied. FIG. 15A shows an example in which the standard printing speed is used.

FIG. 15B shows an example in which ½x printing speed is used. Since the image is output in one scan, among two scans, in the main scanning direction, the slope is calculated by using the slope coefficient that is half of the one calculated on the basis of the number of beams.

FIG. 15C shows an example in which 2x printing speed is used. Since the photosensitive drum moves by an amount corresponding to two scans in one scan, the slope is calculated by using the slope coefficient that is twice the one calculated on the basis of the number of beams.

Specifically, the slope yielded from the number of beams or the printing speed is calculated according to Formula 6.

k*n*mdot/Lmax [Formula 6]

where "k" denotes a multiple of the printing speed.

The amount of shift Δy in all the areas including the exposure profile and the print profile is calculated according to Formula 7 when the scanning is performed in the forward direction.

$$\Delta y = -x*k*n*mdot/L\max + \quad \text{[Formula 7]}$$
$$x*(m1/L)(0 \le x < L) - x*k*n*mdot/L\max +$$
$$m1/Ldot + (x - L/Ldot)*(m2/L)$$
$$(L \le x < 2L) - x*k*n*mdot/L\max + (m1+m2)/Ldot +$$
$$(x - 2L/Ldot)*(m3/L)(2L \le x3L)$$

The amount of shift Δy is calculated according to Formula 8 when the scanning is performed in the reverse direction.

$$\Delta y = x*k*n*mdot/L\max + \quad \text{[Formula 8]}$$
$$x*(m1/L)(0 \le x < L)x*k*n*mdot/L\max + m1/Ldot +$$
$$(x - L/Ldot)*(m2/L)(L \le x < 2L)x*k*n*mdot/L\max +$$
$$(m1+m2)/Ldot + (x - 2L/Ldot)*(m3/L)(2L \le x \le 3L)$$

The printing is started at an offset position depending on the size of the sheet of paper. Accordingly, the initial value of coordinate data "y" used in coordinate conversion in the secondary scanning direction of an image is "yobj" at the offset position. The amount of correction in the vertical direction at the offset position can be calculated according to any of the expressions used for yielding the coordinate data "y".

If the "yobj" is larger than the size of one dot, any color shift can be accurately corrected only after the coordinate conversion in the secondary scanning direction of a quotient of the dot size is finished. The quotient can be corrected by a method of calculating an amount of conversion by using the quotient as an initial value of the coordinate conversion in the color-shift correcting unit to perform the conversion or by a method of calculating an amount of conversion with the initial value of the coordinate conversion in the color-shift correcting unit being set to zero, because the correction value of the quotient is fixed during one print, and adjusting the calculated amount of conversion in accordance with the reading timing in the secondary scanning direction.

Figure 16:
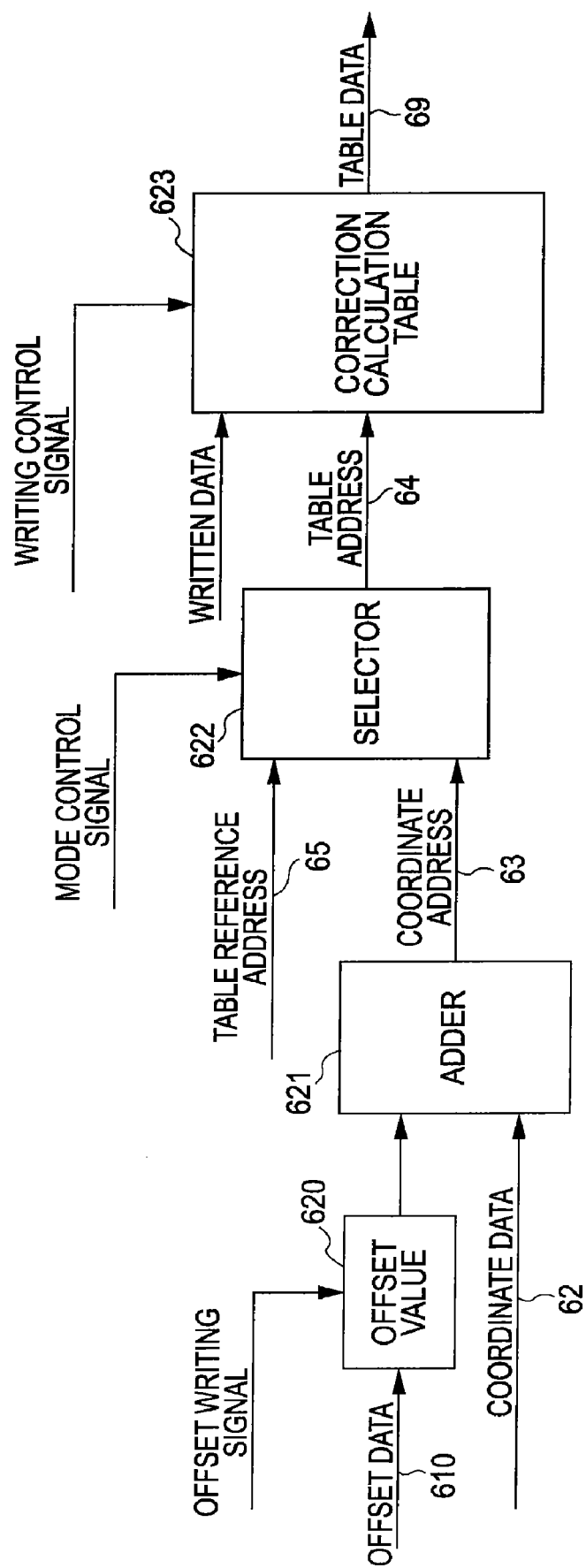
FIG. 16 shows an example of the structure of an amount-of-correction of color-shift calculating unit, according to the first embodiment of the present invention.
Figure 17:
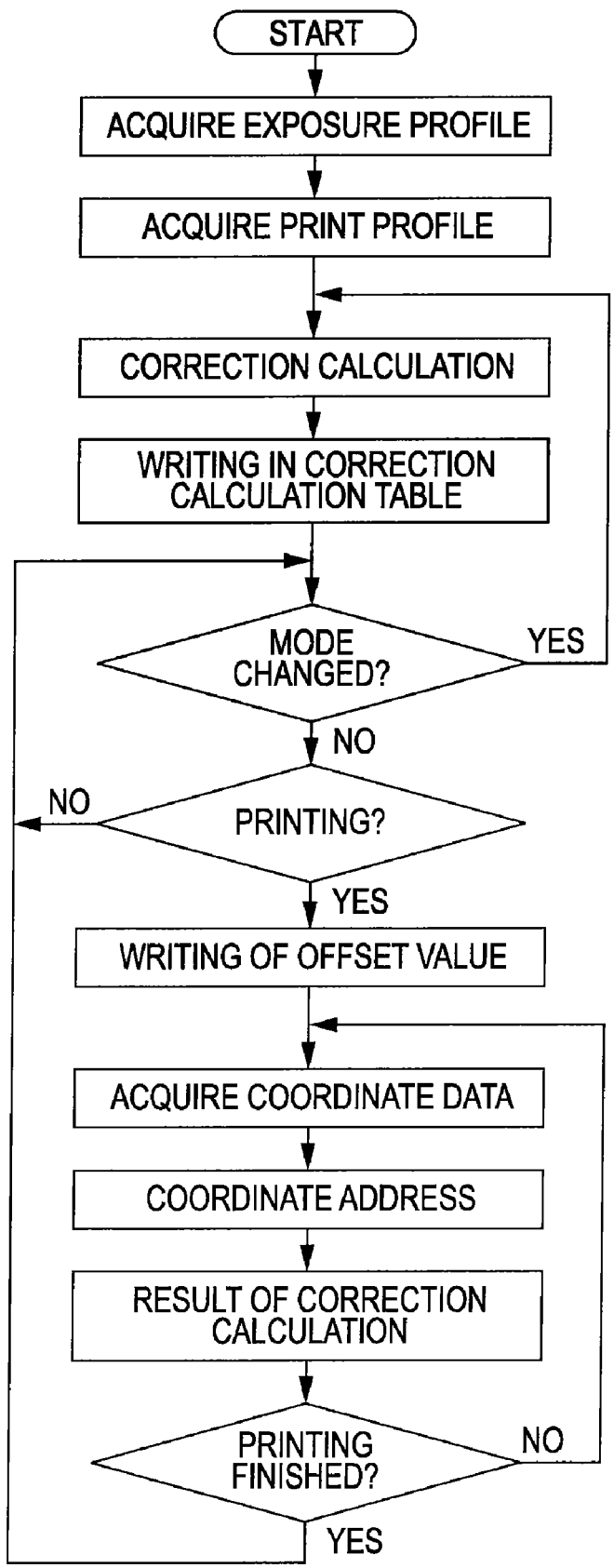
FIG. 17 is a flowchart showing the operation in the example of the structure in FIG. 16, according to the first embodiment of the present invention.

FIG. 16 shows an example of the structure of the amount-of-correction of color-shift calculating unit. FIG. 17 is a flowchart showing the operation in the example of the structure in FIG. 16.

It is sufficient to perform the correction calculation once in the engine. The central processing unit (CPU) (not shown) in the image forming apparatus performs the calculation and writes the result of the calculation in a correction calculation table 623 in FIG. 16. This writing process is performed on startup of the image forming apparatus or when the printing speed is changed. A selector 622 supplies a table reference address 65 to the correction calculation table 623 as a table address 64 when the CPU (not shown) needs an access to the correction calculation table 623. When the CPU does not have an access to the correction calculation table 623, a coordinate address 63 supplied from an adder 621 is used as the table address 64.

Since the size and direction of a target sheet of paper is determined when the printing is started, the CPU (not shown) writes offset data 610 in an offset value 620.

In order to acquire data required for the coordinate conversion from the correction calculation table 623, a correction processing unit supplies coordinate data 62 that is being processed to the amount-of-correction of color-shift calculating unit. In the amount-of-correction of color-shift calculating unit, the adder 621 adds the offset value 620 to the coordinate data 62 and supplies the result of the addition to the selector 622 as the coordinate address 63. The selector 622 supplies the table address 64 to the correction calculation table 623 that supplies table data 69 to the correction processing unit.

In the second stage, any color shift in units less than pixels (i.e. fractions of a pixel) is corrected. Specifically, color shift correcting units 408C, 408M, 408Y, and 408K in units less than pixels correct any color shift caused by the slope and distortion of the main scanning line in fractions of a pixel.

FIG. 8 is a block diagram showing an example of the structure of each of the color shift correcting units 408C, 408M, 408Y, and 408K in fractions of a pixel. Referring to FIG. 8, each of the color shift correcting units 408C, 408M, 408Y, and 408K in units less than pixels (i.e. fractions of a pixel) includes a coordinate counter 801, a coordinate converter 802, a line buffer 803, a density converter 807, and a halftone processor 808.

The line buffer 803 is a memory storing information that has not been subjected to color shift correction in units less than pixels and that is supplied from the band memory 406. The line buffer 803 stores the information in units of lines. The line buffer 803 uses the space in the line memory, corresponding to the amount of correction.

The coordinate counter 801 supplies coordinate data in the main scanning direction and in the secondary scanning direction, to which the color shift correction is to be performed, to the coordinate converter 802. The coordinate counter 801 simultaneously supplies the coordinate data in the main scanning direction to the amount-of-correction of color-shift calculating units 407C, 407M, 407Y, and 407K and the density converter 807.

The density converter 807 performs the correction to the portion after the decimal point of the amount of correction of color shift Δy of the target image on the basis of the coordinate data in the main scanning direction, supplied from the coordinate counter 801, and the amount of correction of color shift Δy. In other words, the density converter 807 adjusts the exposure density between two adjacent dots in the secondary scanning direction in units less than pixels to perform the correction. The density converter 807 refers to the line buffer 803 to determine the two adjacent dots in the secondary scanning direction. The coordinate converter 802 changes the shape of, for example, a window 2301 in FIG. 20B into the shape of a portion surrounded by a broken line in the area including the coordinate that is subjected to the coordinate conversion, in accordance with the coordinate information supplied from the amount-of-correction of color-shift calculating units 407C, 407M, 407Y, and 407K, to perform the correction. This change is based on the coordinate data in the main scanning direction and the secondary scanning direction, supplied from the coordinate counter 801, and the amount of correction of color shift Δy supplied from the amount-of-correction of color-shift calculating units 407C, 407M, 407Y, and 407K. In the areas other than the area including the coordinate that is subjected to the coordinate conversion, the coordinate converter 802 performs the coordinate conversion in a portion around a target line (portion surrounded by a solid line). This coordinate conversion allows the information before the color shift correction to be processed to provide data to be corrected in fractional units—i.e. units less than pixels.

Figure 6A:
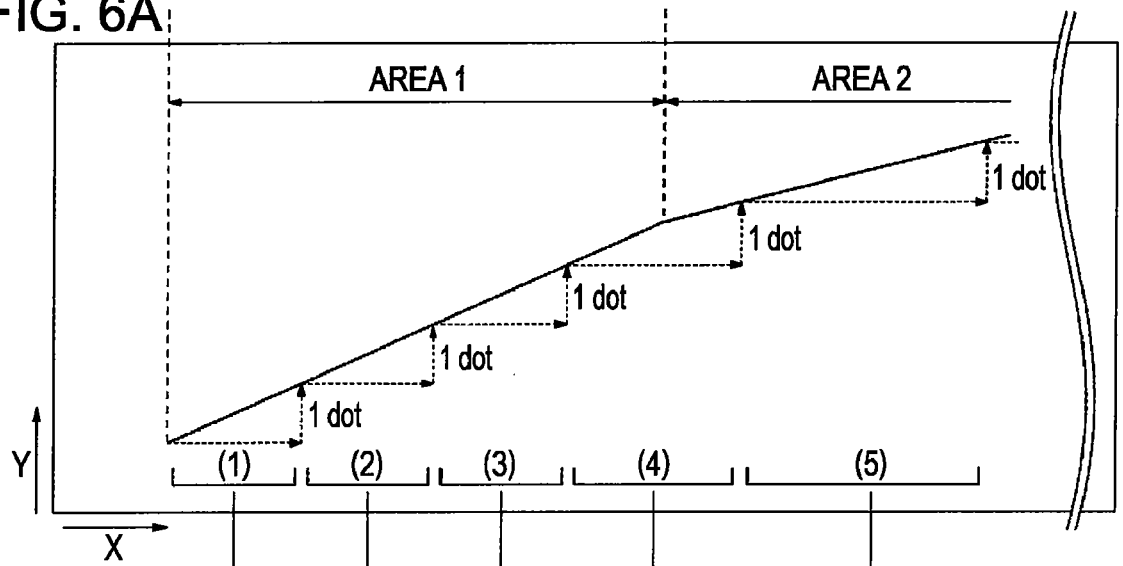
FIGS. 6A to 6C show how a coordinate conversion unit corrects the amount of color shift in the integer portion of an amount of correction of color shift, according to the first embodiment of the present invention.
Figure 6B:
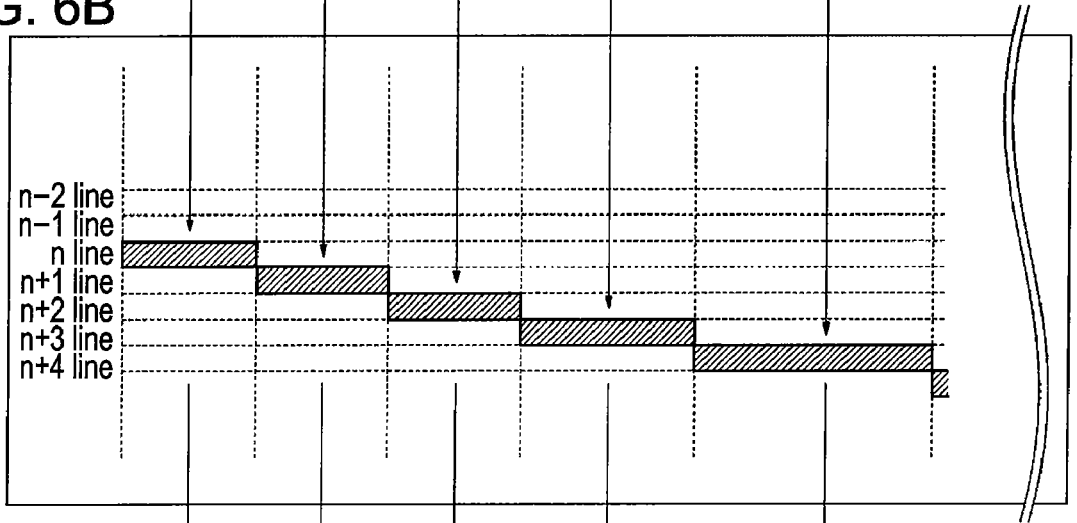
Figure 6C:
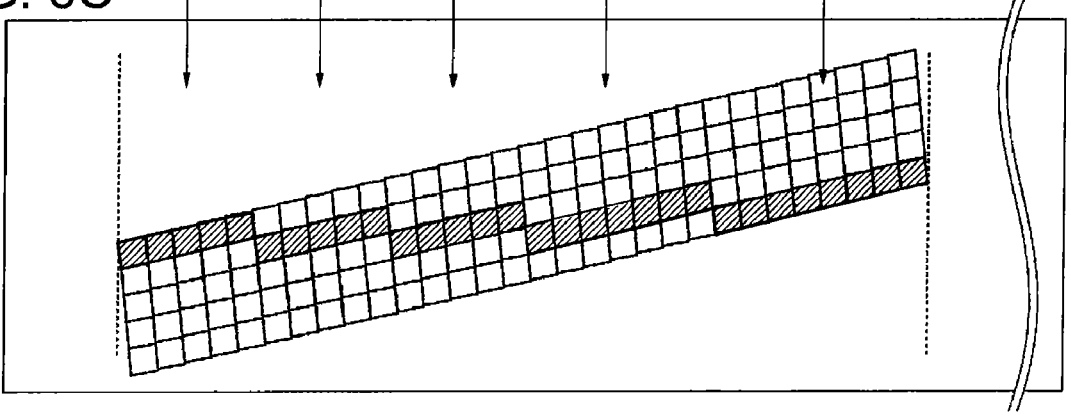

FIGS. 6A to 6C show how to correct the amount of color shift in the integer portion of the amount of correction of color shift Δy in the first stage, described above. The value of the integer portion of the amount of correction of color shift Δy, which is approximated to a straight line, as shown in FIG. 6A, and which is calculated from information about the color shift of the main scanning line, is stored in a line buffer 406C, 406M, 406Y, or 406K in FIGS. 1A and 1B. If the coordinate in the secondary scanning direction, supplied from the coordinate counter 801, is "n", as shown in FIG. 6B, the amount of correction of color shift Δy is equal to a value that is not less than zero and less than one in an area (1) in the main scanning direction (the X direction). In order to regenerate data in the n-th line, the data in the n-th line is written in the bitmap memory. In an area (2), the amount of correction of color shift Δy is equal to a value that is not less than one and less than two. In order to regenerate data in the n-th line, the coordinate conversion is performed to write the bitmap image at a position given by offsetting the number of lines in the secondary scanning direction in one scan, that is, to write data in the n+1-th line of the bitmap memory. Similarly, the coordinate conversion is performed to write data in the n+2-the line in an area (3) and to write data in the n+3-th line in an area (4). The regeneration of the data in the secondary scanning direction in units of pixels is performed in the manner described above. FIG. 6C shows an example of an exposure image on the image carrier, formed by using the image data that has been subjected to the color shift correction in units of integer numbers of pixels by the coordinate conversion.

FIGS. 7A to 7F show how the density converter 807 corrects the amount of color shift in fractional pixel units, that is, how to correct the amount of color shift in the portion after the decimal point of the amount of correction of color shift Δy. The amount of color shift in the portion after the decimal point is corrected by adjusting the exposure density of two adjacent dots in the secondary scanning direction.

FIG. 7A shows an exemplary image of the main scanning line that slopes upward. FIG. 7B shows a bitmap image of a horizontal straight line before the density conversion. FIG. 7C shows a corrected image of the bitmap image in FIG. 7B, used for offsetting the color shift caused by the slope of the main scanning line. In order to realize the corrected image in FIG. 7C, the amount of exposure of two adjacent dots in the secondary scanning direction is adjusted. FIG. 7D is a table showing the relationship between the amount of correction of color shift Δy and the correction coefficients for the density conversion. In the table in FIG. 7D, "k" denotes the integer portion of the amount of correction of color shift Δy (dropping the fractional part) and represents the amount of correction in the secondary scanning direction in units of pixels. "β" and "α" denote correction coefficients used for the correction in the secondary scanning direction in fractional pixel units and represent the distribution factors of the amount of exposure of two adjacent dots in the secondary scanning direction. "β" and "α" are calculated according to Formula 9 on the basis of the information about the fractional part of the amount of correction of color shift Δy.

$$\beta = \Delta y - k$$

$$\alpha = 1 - \beta \quad \text{[Formula 9]}$$

"α" denotes the distribution factor of the preceding dot and "β" denotes the distribution factor of the succeeding dot.

FIG. 7E shows a bitmap image that has been subjected to the density conversion for adjusting the exposure density of the two adjacent dots in the secondary scanning direction in accordance with the correction coefficients shown in the table in FIG. 7D. FIG. 7F shows an exposure image on the image carrier of the bitmap image that has been subjected to the density conversion. In the exposure image shown in FIG. 7F, the slope of the main scanning line is offset to form a horizontal straight line.

The density converter 807 is described above in terms of a general image.

In the case of a line formed in a width corresponding to one dot, when the bitmap image is distributed to two adjacent dots in the vertical direction to reproduce the image, as shown in FIGS. 18A to 18F, it is not possible to represent the density of one dot because of the relationship between the dots if the sum of the correction coefficient of the upper dot and that of the lower dot is equal to one. Accordingly, the image might be reproduced by setting the sum of the correction coefficient of the upper dot and that of the lower dot to, for example, 1.2.

In the case of a bitmap image in which whether data exists is varied in units of dots, only the coordinate conversion is performed and the amount of correction table of the original image data should be output, as shown in FIGS. 19A to 19F, in order to minimize the degradation in the image quality due to the conversion and correction.

The attribute data processed in the host is used to determine which table is used.

The halftone processor 808 will now be described. The halftone processor 808 reduces the number of bits in the input image information having multiple bits and keeps the halftone reproducibility of the image. Varying the cell size used in the halftoning process in accordance with the kind of the image information allows the image to be correctly reproduced. The halftone processor 808 performs the above processing by using the supplied attribute information.

Figure 9A:
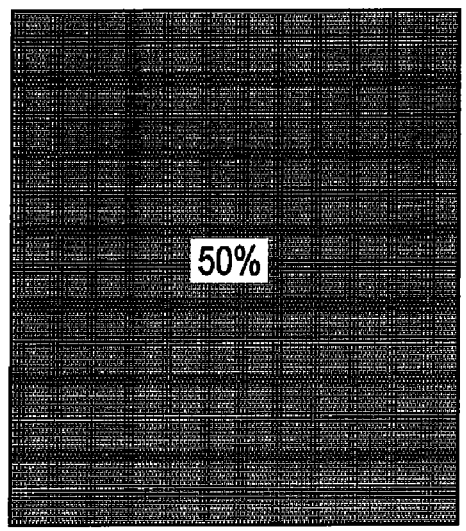
FIGS. 9A to 9C show images in color shift correction and halftoning, according to the first embodiment of the present invention.
Figure 9B:
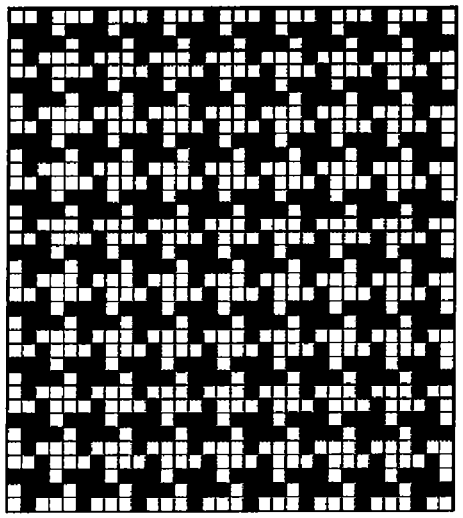
Figure 9C:
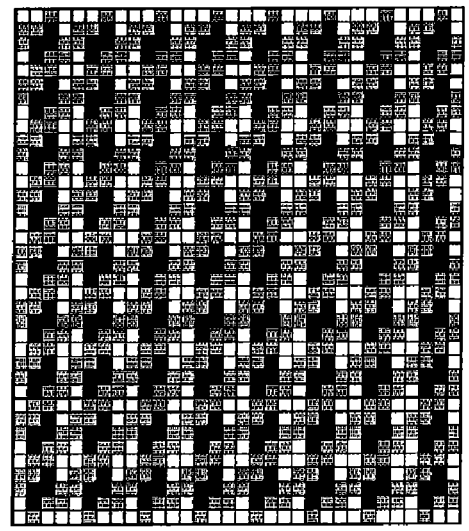
Figure 10A:
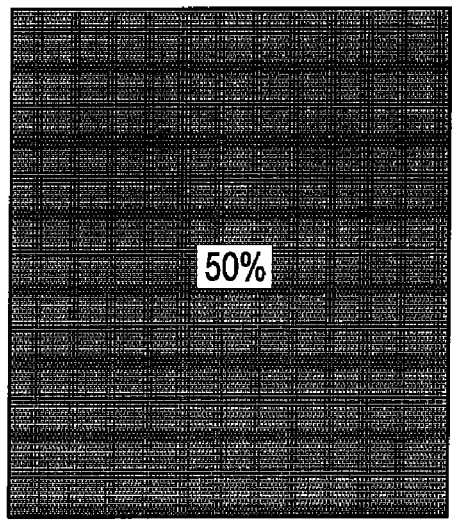
FIGS. 10A to 10C show images in the color shift correction and the halftoning, according to the first embodiment of the present invention.
Figure 10B:
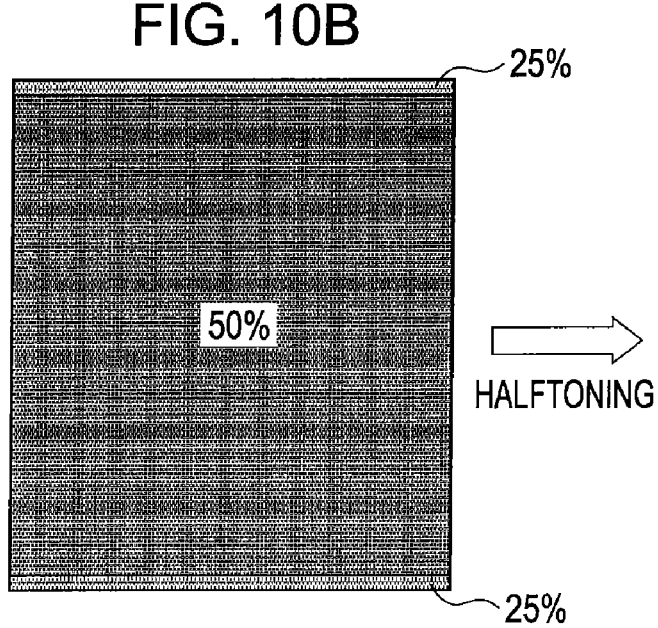
Figure 10C:
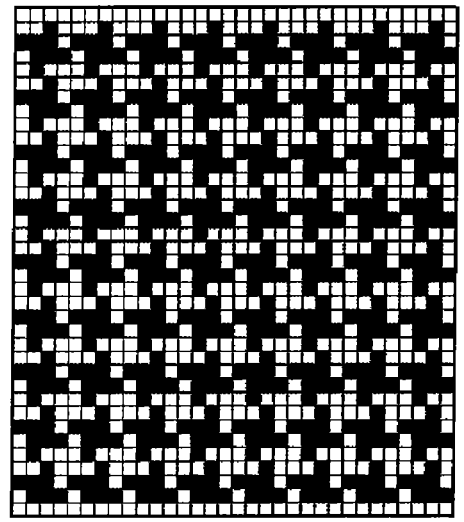

A case in which the halftoning and the color shift correction are sequentially performed in this order to the input image and a case in which the color shift correction and the halftoning are sequentially performed in this order to the input image will now be described with reference to FIGS. 9A to 9C and FIGS. 10A to 10C, respectively. FIGS. 9A to 9C illustrate the case in which the halftoning and the color shift correction are sequentially performed in this order to the input image. FIG. 9A shows an input image having a uniform density of 50%. FIG. 9B shows an image yielded by performing the halftoning using a 4×4 halftone pattern to the input image in FIG. 9A. If this is a desired image and an image similar to this image can be yielded even after the color shift correction, the color shift correction is realized with no image degradation. FIG. 9C shows an image yielded by performing ½-pixel color shift correction in the vertical direction to the image that has been subjected to the halftoning. As apparent from FIG. 9C, performing the color shift correction to the image that has been subjected to the halftoning causes degradation in the reproducibility of the dots in the halftone image. In contrast, FIGS. 10A to 10C illustrate the case in which the color shift correction and the halftoning are sequentially performed in this order to the input image. FIG. 10A shows an input image having a uniform density of 50%, as in the image shown in FIG. 9A. FIG. 10B shows an image yielded by performing the ½-pixel color shift correction in the vertical direction to the input image. The color shift correction results in the image including portions having a density of 25% in the top and bottom lines. FIG. 10C shows an image yielded by performing the halftoning to the image that has been subjected to the color shift correction. The image shown in FIG. 10C differs from the image shown in FIG. 9B because the image in FIG. 10B includes the portions having a density of 25% in the top and bottom lines. However, the other portions in the image in FIG. 10C are similar to those in the image in FIG. 9B. In addition, no degradation in the reproducibility of the dots occurs in the halftone image in FIG. 10C, unlike the image shown in FIG. 9C.

However, as shown in FIG. 11, the edge portions in the image are formed in accordance with the halftone pattern used in the halftoning. Accordingly, the result of the density conversion is disabled to cause gaps or discontinuity in the edge portions, thus generating a jagged image. The image can be distorted also depending on the characteristics of the image information. In order to prevent such distortion, the characteristics of the image information are detected in a smoothing determination process to determine the settings for the density conversion and the setting for the halftoning in accordance with the detected characteristics.

The smoothing determination will now be described. In the smoothing determination, a smoothing determination pattern is compared with the image information, as shown in FIGS. 20A to 20F. The attribute data is set such that the density conversion described above with reference to FIGS. 20A to 20F is performed to the image information matching with the smoothing determination pattern. In contrast, the density conversion described above with reference to FIGS. 7A to 7F is performed to the image information that does not match with the smoothing determination pattern.

The attribute data set in the host 402 is used to determine the density conversion table used in the density conversion unit and to select the halftoning or exception handling. If the attribute data indicates the halftoning and the density conversion shown in FIGS. 20A to 20F, the density conversion table shown in FIG. 20D and the halftoning are selected. If the attribute data does not indicate the halftoning but indicates the density conversion shown in FIGS. 7A to 7F, the density conversion table shown in FIG. 7D and the exception handling are selected. If no attribute data is specified, a default density conversion table and the halftoning are selected.

The characteristics of the image can be grouped on the basis of the attributes of the image data. Selecting a smoothing determination pattern from a group of the smoothing determination patterns for every attribute information and comparing the selected smoothing determination pattern with the image information, as shown in FIGS. 20A to 20F, allow the smoothing determination to be effectively performed.

Figure 12:
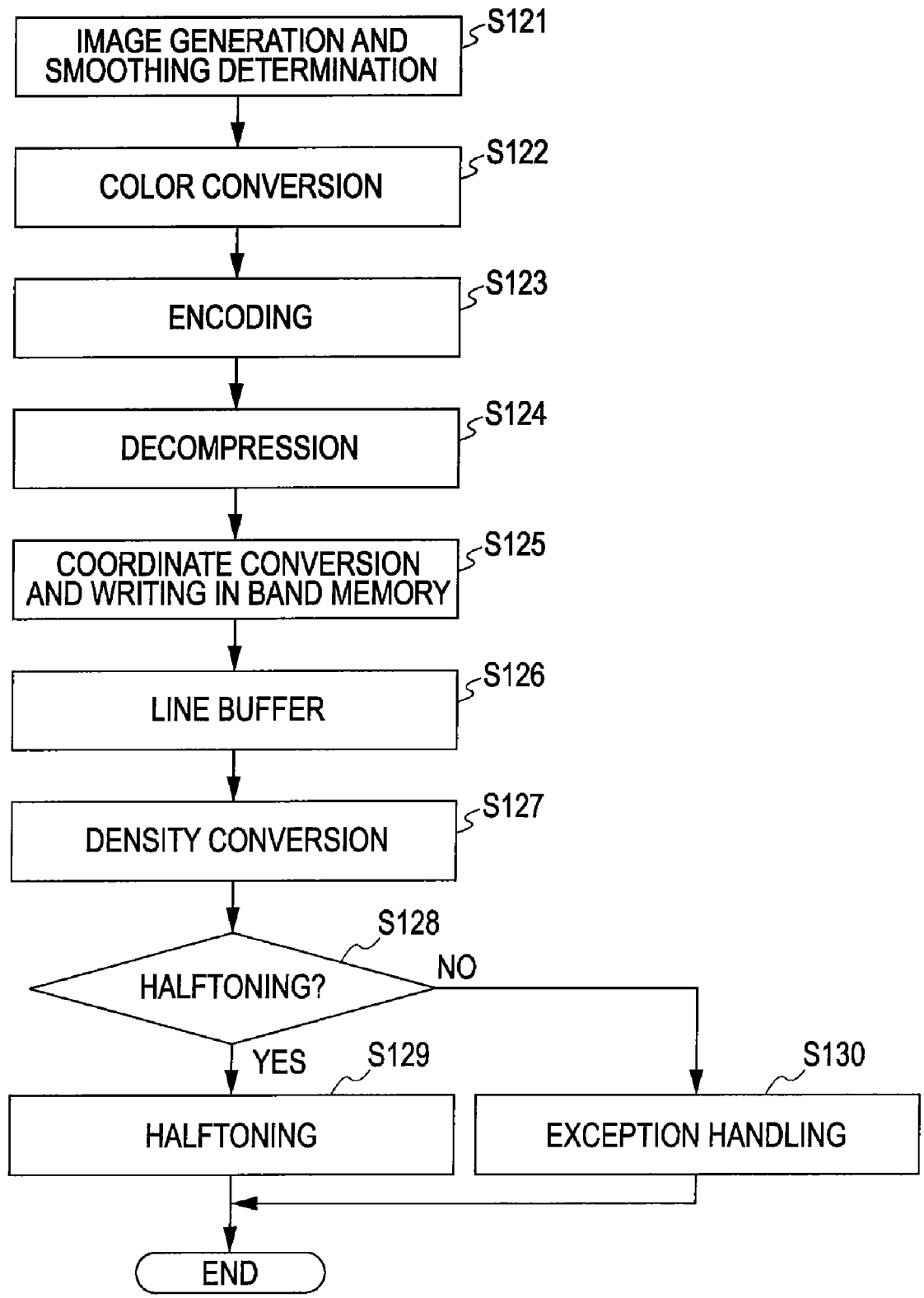
FIG. 12 is a flowchart showing a process in an edge detecting unit, according to the first embodiment of the present invention.

FIG. 12 is a flowchart showing the process described above. In Step S121, the host 402 performs the image generation and smoothing determination. In Step S122, the host 402 performs the color conversion into the YMCK colors. In Step S123, the host 402 performs the encoding. In Step S124, the controller 403 performs the decompression. In Step S125, the controller 403 determines the writing address by the coordinate conversion and writes the writing address in the band memory 406. In Step S126, the controller 403 writes the data stored in the band memory 406 in the line buffers 406C, 406M, 406Y, and 406K. In Step S127, the controller 403 performs the density conversion to the data in the line buffers 406C, 406M, 406Y, and 406K on the basis of the coordinate information. In Step S128, the controller 403 selects the halftoning or the exception handling on the basis of the attribute information. In Step S129, the controller 403 performs the halftoning. In Step S130, the controller 403 performs the exception handling. The exception handling includes bit slicing in which information that has been subjected to the density conversion is associated with the data width after the halftoning.

The image data supplied from exception handling units 411C, 411M, 411Y, and 411K and the halftone processing units 410C, 410M, 410Y, and 410K, shown in FIGS. 1A and 1B, is subjected to pulse width modulation and is converted into a binary laser driving signal. The laser driving signal is supplied to the exposure units and the image data is exposed to light emitted from the exposure units.

The image forming apparatus according to the first embodiment of the present invention adopts a common encoding method, such as encoding in units of block or run-length encoding, for image and attribute data.

According to the first embodiment of the present invention, an amount of correction of color shift is calculated on the basis of the amount of color shift supplied from the amount-of-color-shift storing unit provided for every image station and the coordinate conversion is performed by using the calculated amount of correction of color shift to correct the color shift in units of pixels. The characteristics of the image after the color shift correction are detected and the density conversion for correcting any color shift in units less than pixels is performed in accordance with the detected characteristics. The halftoning or the exception handling is selectively performed in accordance with the detected characteristics. The image station outputs the image of each color at a position offsetting any registration error caused by mechanical displacement of the optical scanning system and the image of each color is corrected in unit less than the minimum coordinate unit in the main scanning direction. As a result, it is possible to output the color image having no color shift and no degradation at high speed.

Since the image forming system is structured so as to simultaneously calculate the amounts of correction in consideration of the characteristics of the engine, it is possible to improve the development efficiency and to reduce the cost of the entire image forming system.

Second Exemplary Embodiment

Figure 21B:
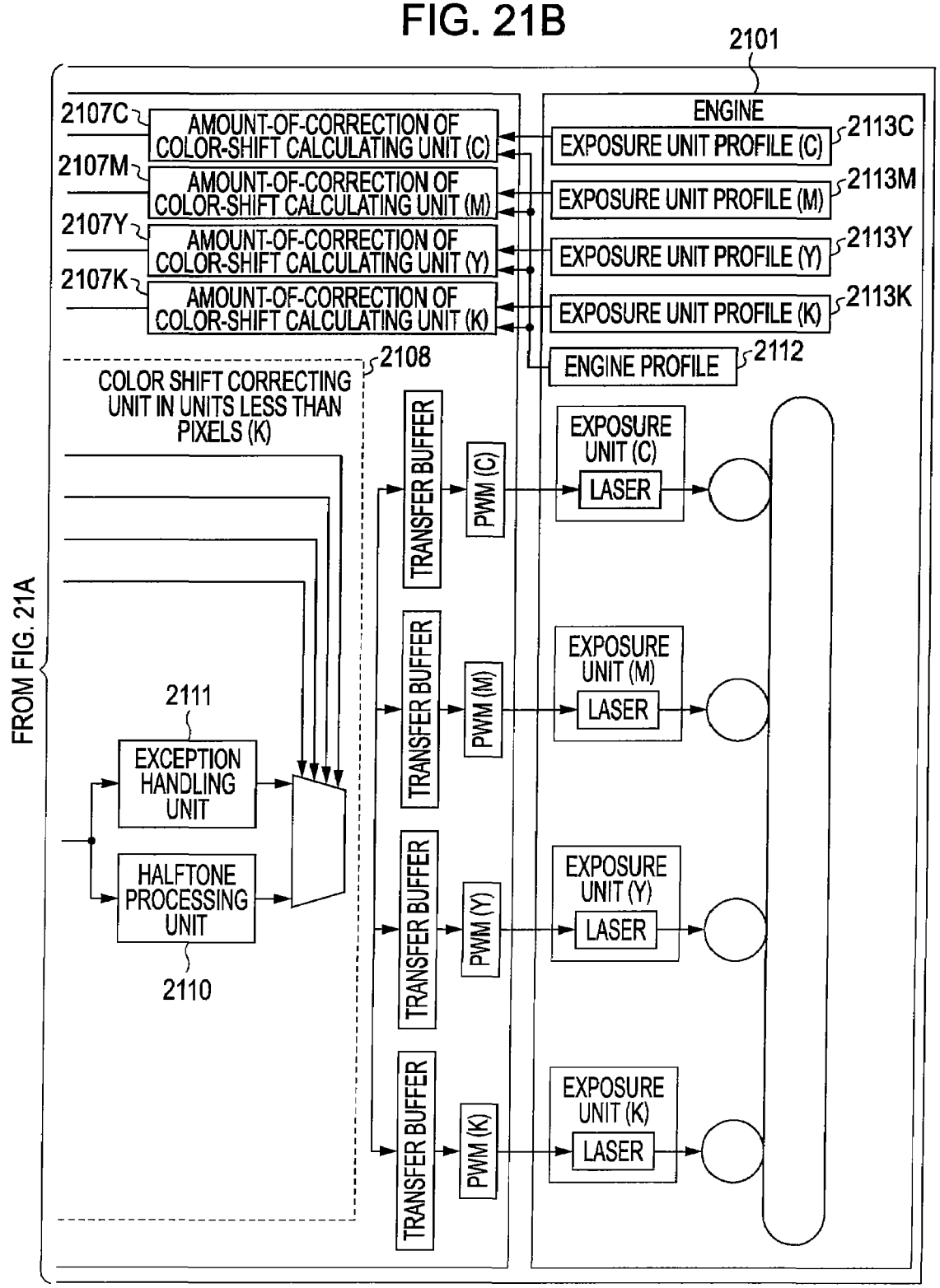

The color shift correcting units in units less than pixels of a number corresponding to the number of colors are provided in the first embodiment of the present invention. In contrast, only one color shift correcting unit in units less than pixels is provided in a second embodiment of the present invention. FIGS. 21A and 21B show an example of the structure of an image forming system according to the second embodiment of the present invention.

In the image forming system in FIGS. 21A and 21B, data in the CMYK colors, supplied from a band memory 2106, is switched and supplied to a line buffer, the processing result is stored in the transfer buffer for the color corresponding to the result of the switching, and the stored data is supplied to an engine 2101.

The transfer buffers may be shared with the band memory 2106 in units of pages. In this case, the transfer buffers immediately before the pulse width modulation are provided for every line.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-368244 filed Dec. 21, 2005, which is hereby incorporated by reference herein in its entirety.

What is claimed is:

1. An image processing system comprising:

a host computer;

an image processing apparatus; and a transferring unit that transfers image characteristics information and pixel data of an image from the host computer to the image processing apparatus;

wherein the host computer includes:
an image-characteristics-information generating unit that generates the image characteristics information of the image; and wherein the image processing apparatus includes:
an amount-of-color-shift storing unit that stores information concerning an amount of color shift in a sub scanning direction at an exposure position for scanning of an image carrier in a main scanning direction;

an image data storing unit that stores multiple pieces of the pixel data;

a coordinate conversion unit that converts the coordinate of a writing address used in the writing in the image data storing unit, based on an amount of color shift in integer pixel units, and reads out the pixel data concerning a target pixel from the image data storing unit in accordance with address information after the coordinate conversion; and a density conversion unit that converts the pixel density of the pixel data based on the image characteristics information and the amount of color shift in fractional pixel units.

2. An image processing system as claimed in claim 1, wherein the host computer further includes a data compressing unit for compressing the pixel data.

3. An image processing system as claimed in claim 1, further comprising an image forming unit having an image carrier, an exposure section emitting light to which the image carrier is exposed, and a developing section developing an electrostatic latent image resulting from the exposure on a recording medium.

4. An image processing apparatus comprising:
a receiving unit that receives image characteristics information and pixel data of an image from a host computer;
an amount-of-color-shift storing unit that stores information concerning an amount of color shift in a sub scanning direction at an exposure position for scanning of an image carrier in a main scanning direction;
an image data storing unit that stores multiple pieces of the pixel data;
a coordinate conversion unit that converts the coordinate of a writing address used in the writing in the image data storing unit, based on an amount of color shift in integer pixel units, and reads out the pixel data concerning a target pixel from the image data storing unit in accordance with address information after the coordinate conversion; and
a density conversion unit that converts a pixel density of the pixel data based on the image characteristics information and the amount of color shift in fractional pixel units.

5. An image processing apparatus as claimed in claim 4, wherein the receiving unit receives compressed pixel data of the image from the host computer.

6. An image processing apparatus as claimed in claim 4, further comprising an image forming unit having the image carrier, an exposure section emitting light to which the image carrier is exposed, and a developing section developing an electrostatic latent image resulting from the exposure on a recording medium.

7. An image processing method comprising:
a receiving step in which an image processing apparatus receives image characteristics information and pixel data of an image from a host computer;
an amount-of-color-shift storing step that stores information concerning an amount of color shift in a sub scanning direction at an exposure position for scanning of an image carrier in a main scanning direction;
an image data storing step that stores multiple pieces of the pixel data in a memory unit;
a coordinate conversion step that converts the coordinate of a writing address used in the writing in the image data storing step, based on an amount of color shift in integer pixel units, and reads out the pixel data concerning a target pixel from the memory in accordance with address information after the coordinate conversion; and
a density conversion step that converts a pixel density of the pixel data based on the image characteristics information and the amount of color shift in fractional pixel units.

8. An image processing method as claimed in claim 7, wherein the receiving step receives compressed pixel data of the image from the host computer.

9. An image processing method as claimed in claim 7, further comprising an image forming step for using the image carrier, an exposure section emitting light to which the image carrier is exposed, and a developing section developing an electrostatic latent image resulting from the exposure on a recording medium.

* * * * *